US010067456B2

(12) United States Patent
Okamoto

(10) Patent No.: US 10,067,456 B2
(45) Date of Patent: Sep. 4, 2018

(54) DRIVE TRANSMITTING DEVICE AND IMAGE FORMING APPARATUS INCLUDING THE SAME

(71) Applicant: KYOCERA Document Solutions Inc., Osaka (JP)

(72) Inventor: Sueaki Okamoto, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/655,983

(22) Filed: Jul. 21, 2017

(65) Prior Publication Data

US 2018/0032021 A1 Feb. 1, 2018

(30) Foreign Application Priority Data

Jul. 28, 2016 (JP) ................................. 2016-148545

(51) Int. Cl.
| | |
|---|---|
| G03G 15/00 | (2006.01) |
| F16H 3/30 | (2006.01) |
| F16H 3/78 | (2006.01) |
| G03G 21/16 | (2006.01) |

(52) U.S. Cl.
CPC ............ *G03G 15/757* (2013.01); *F16H 3/30* (2013.01); *F16H 3/78* (2013.01); *G03G 21/1647* (2013.01); *G03G 2215/00679* (2013.01); *G03G 2221/1657* (2013.01)

(58) Field of Classification Search
USPC .......................... 399/66, 121, 159, 167, 297
See application file for complete search history.

(56) References Cited

U.S. PATENT DOCUMENTS

| 8,213,835 B2* | 7/2012 | Okamoto | G03G 15/167 |
| | | | 399/121 |
| 9,256,177 B2* | 2/2016 | Watanabe | G03G 15/2067 |

FOREIGN PATENT DOCUMENTS

JP 06-258968 A 9/1994

* cited by examiner

*Primary Examiner* — Hoan Tran
(74) *Attorney, Agent, or Firm* — Studebaker & Brackett PC

(57) ABSTRACT

A drive transmitting device includes a first rotator, a second rotator, a rotation driver, and a linker. The first rotator is rotatable. The second rotator is rotatable in a state where the second rotator comes into pressure contact with the first rotator. The rotation driver rotates the first rotator. The linker links speed change operation with pressure change operation, the speed change operation being operation to change a speed ratio of a surface of the first rotator and a surface of the second rotator, the pressure change operation being operation to change pressure force of the second rotator to the first rotator.

14 Claims, 17 Drawing Sheets

DRIVE TRANSMITTING DEVICE AND IMAGE FORMING APPARATUS INCLUDING THE SAME

INCORPORATION BY REFERENCE

This application is based on and claims the benefit of priority from Japanese patent application No. 2016-148545 filed on Jul. 28, 2016, which is incorporated by reference in its entirety.

BACKGROUND

The present disclosure relates to a drive transmitting device and an image forming apparatus including the same.

An image forming apparatus of an electrographic manner includes a transferring roller which transfers a toner image carried on a photosensitive drum to a sheet.

For example, an image forming apparatus includes a variable motor coupled to an image carrier and a constant speed motor coupled to a transferring roller. The variable motor changes a peripheral speed of the image carrier in accordance with a thickness of a recording sheet. The constant speed motor rotates the transferring roller at a constant speed.

SUMMARY

In accordance with an embodiment of the present disclosure, a drive transmitting device includes a first rotator, a second rotator, a rotation driver, and a linker. The first rotator is rotatable. The second rotator is rotatable in a state where the second rotator comes into pressure contact with the first rotator. The rotation driver rotates the first rotator. The linker links speed change operation with pressure change operation, the speed change operation being operation to change a speed ratio of a surface of the first rotator and a surface of the second rotator, the pressure change operation being operation to change pressure force of the second rotator to the first rotator.

In accordance with an embodiment of the present disclosure, an image forming apparatus includes the drive transmitting device.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, preferred embodiments of the present disclosure will be described with reference to the accompanying drawings.

Figure 1:
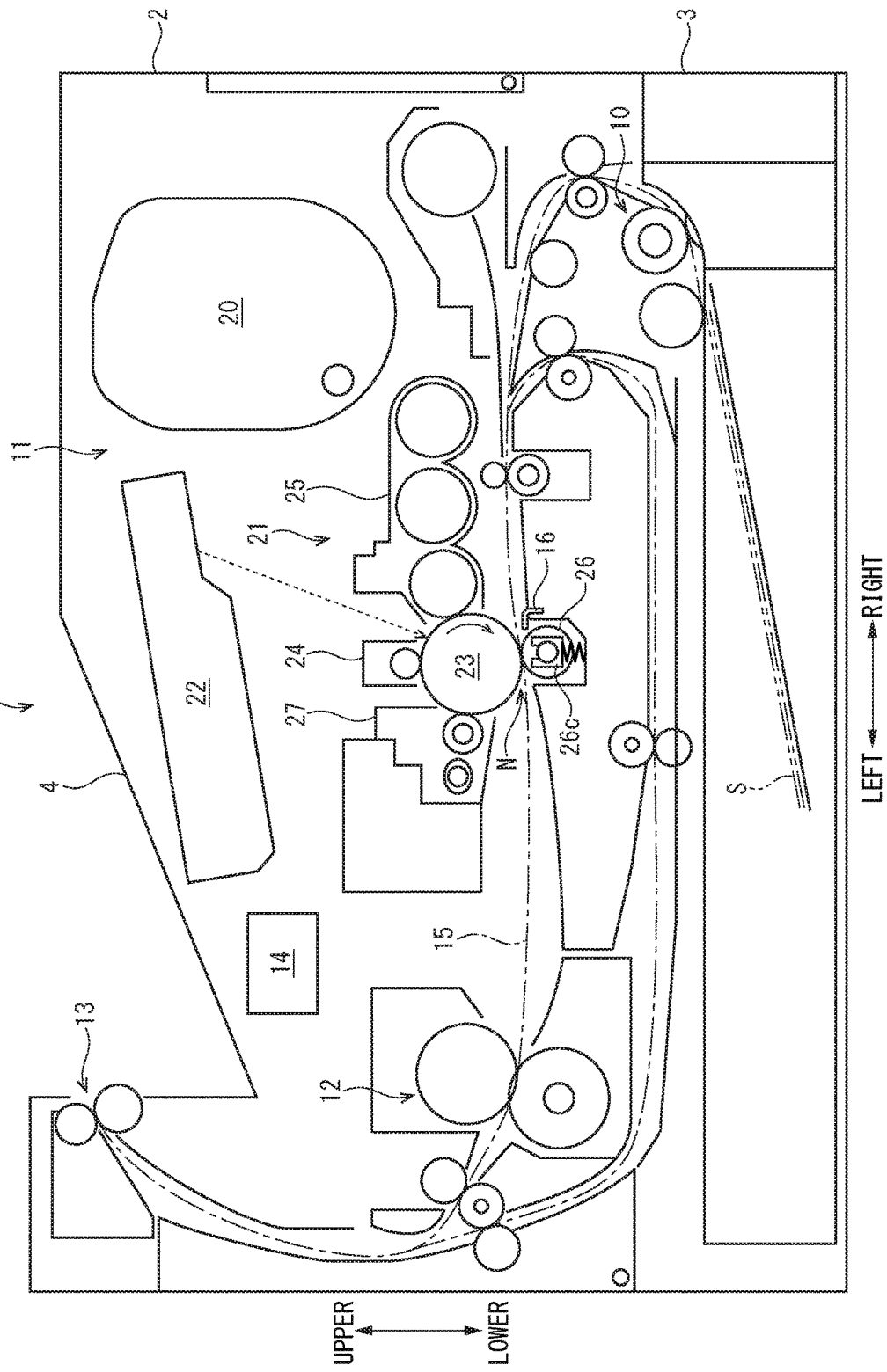
FIG. 1 is a sectional view schematically showing an internal structure of a printer according to a first embodiment of the present disclosure.

With reference to FIG. 1, a printer 1 (image forming apparatus) according to a first embodiment will be described. FIG. 1 is a sectional view schematically showing an internal structure of the printer 1. In the following description, a sheet near side of FIG. 1 is defined as a front side of the printer 1, and other directions are defined with reference to the directions shown in the respective figures.

The printer 1 includes an apparatus main body 2, a sheet feeding cartridge 3, and a sheet ejecting tray 4. The sheet feeding cartridge 3 is attachably/detachably provided at a lower part of the apparatus main body 2. In the sheet feeding cartridge 3, (a pack of) sheets S are housed. The sheet ejecting tray 4 is provided on a top face of the apparatus main body 2.

The printer 1 includes a sheet feeding unit 10, an image forming unit 11, a fixing device 12, a sheet ejecting unit 13, and a controller 14. The sheet feeding unit 10 is provided at an upstream end of a conveying path 15 extending from the sheet feeding cartridge 3 to the sheet ejecting tray 4. The image forming unit 11 and the fixing device 12 are provided at an intermediate part of the conveying path 15. The sheet ejecting unit 13 is provided at a downstream end of the conveying path 15. The controller 14 integrally controls the printer 1.

The image forming unit 11 includes a toner container 20, a drum unit 21, and a light scanning device 22. The drum unit 21 is configured so that a charger 24, a development device 25, a transferring roller 26, and a cleaning device 27 are disposed around a photosensitive drum 23. The photosensitive drum 23 (first rotator) and the transferring roller 26 (second rotator) are formed in a cylindrical shape which is elongated in a front-and-rear direction (rotation axis direction), and are disposed to be parallel with each other. The photosensitive drum 23 is provided to be rotatable around a shaft. The transferring roller 26 is provided to be rotatable around another shaft while coming into pressure contact with the photosensitive drum 23. The transferring roller 26 comes into pressure contact with the photosensitive drum 23 from a lower side so as to form a transferring nip N. The photosensitive drum 23 is rotated by a rotation driver 40 (which will be described later), and the transferring roller 26 rotates according to rotation of the photosensitive drum 23.

The controller 14 executes image forming processing based on input image data. The charger 24 charges a surface of the photosensitive drum 23. The light scanning device 22 exposes the photosensitive drum 23, and forms an electrostatic latent image on the photosensitive drum 23. The development device 25 develops the electrostatic latent image to a toner image by employing a toner (developer) which is supplied from the toner container 20. On the other hand, the sheet feeding unit 10 feeds out sheets in the sheet feeding cartridge 3 to the conveying path 15 on a one by one basis. A transfer bias is applied to the transferring roller 26. The toner image that is carried on the photosensitive drum 23 is transferred to the sheets passing through the transferring nip N. The fixing device 12 fixes the toner image to the sheets S. The sheets S after fixed are ejected onto the sheet ejecting tray 4 by the sheet ejecting unit 13.

In the meanwhile, for example, in a case where so called standard paper is used as a sheet S, in order to prevent excessive transfer or toner scattering, the sheet S is conveyed so as to be wound around the photosensitive drum 23. Thus, at an upstream side of the transferring nip N, a pre-transfer guide 16 is provided to direct a tip end of the sheet to the photosensitive drum 23 side. Also, in order to ensure appropriate toner transfer to the standard paper, a conveyance speed of the sheet S (peripheral speed (surface speed) of the transferring roller 26) is set to be slightly faster than a peripheral speed of the photosensitive drum 23. In order to achieve conveyance of the sheet S as described above, a peripheral speed ratio (surface speed ratio) between the photosensitive drum 23 and the transferring roller 26 and a pressure force of the transferring roller 26 to the photosensitive drum 23 (nipping pressure of the transferring nip N) are set in a predetermined range.

Alternatively, in a case where a cardboard (thicker paper than the standard paper) is used as a sheet S, a sliding load between the sheet S and the pre-transfer guide 16 increases and thus the conveyance speed of the sheet S may lower. In this case, appropriate conveyance of the sheet S cannot be carried out, and a magnification difference (poor degree of magnification) may arise with an image which is transferred to the sheet S. In order to solve such a problem, it is contemplated to increase the conveyance speed of the sheet S by increasing a rotation speed of the transferring roller 26. However, if the rotation speed of the transferring roller 26 is changed, a balance of a nipping pressure of the transferring nip N may be lost. Namely, between a front side and a rear side of the transferring nip N, a difference arises in the nipping pressure. Such a difference in the nipping pressure may become a cause of a magnification difference in the front-and-rear direction or a transfer failure.

Figure 2:
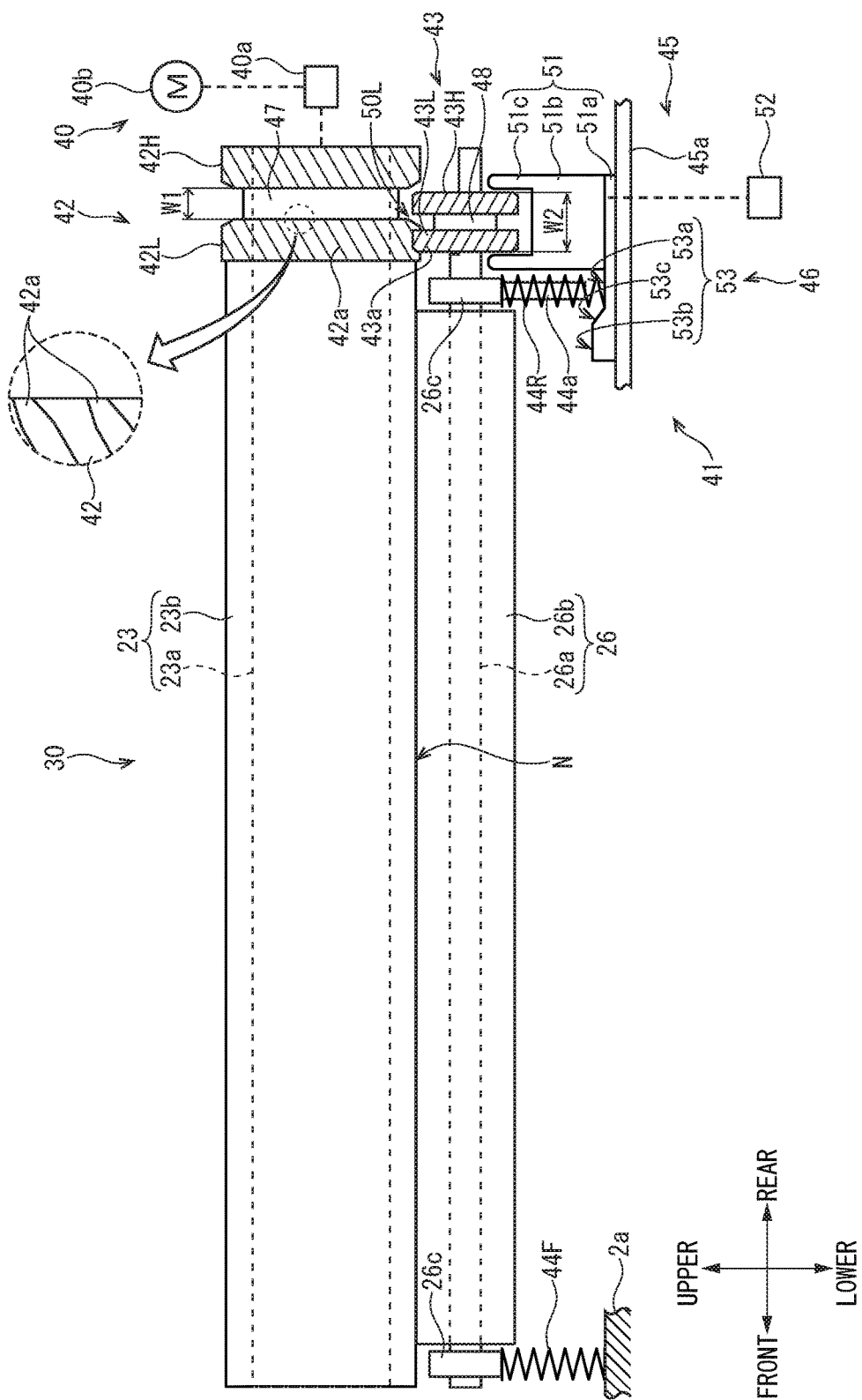
FIG. 2 is a side view showing a drive transmitting device (a low speed gear train) according to the first embodiment of the present disclosure.
Figure 3:
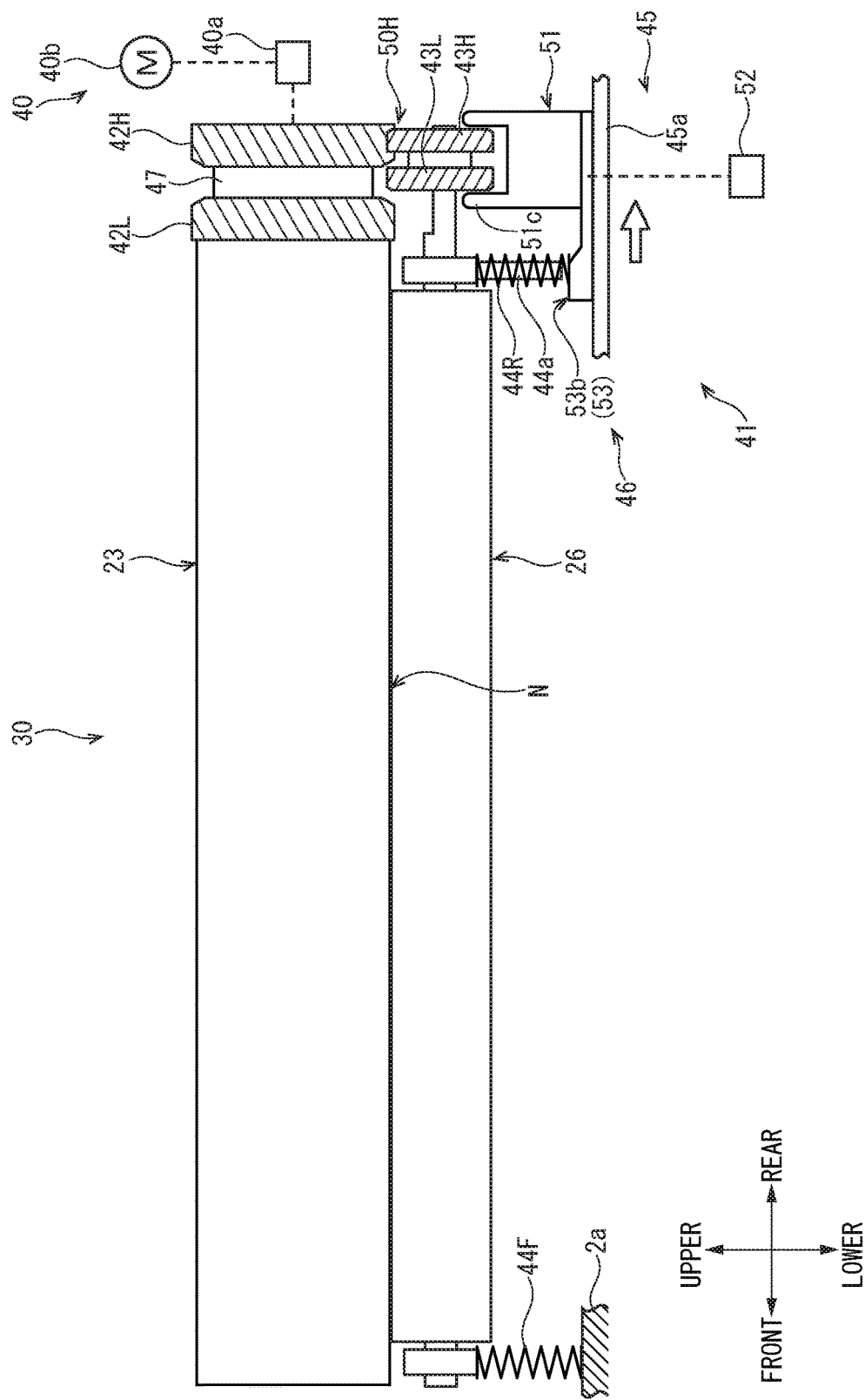
FIG. 3 is a side view showing the drive transmitting device (a high speed gear train) according to the first embodiment of the present disclosure.

Accordingly, the printer 1 includes a drive transmitting device 30 which changes the pressure force of the transferring roller 26 to the photosensitive drum 23 in accordance with change of the peripheral speed ratio between the photosensitive drum 23 and the transferring roller 26. Hereinafter, with reference to FIG. 2 and FIG. 3, the drive transmitting device 30 will be described. FIG. 2 is a side view showing the drive transmitting device 30 (low speed gear train 50L). FIG. 3 is a side view showing the drive transmitting device 30 (high speed gear train 50H).

As shown in FIG. 2, the drive transmitting device 30 includes the photosensitive drum 23, the transferring roller 26, a rotation driver 40, and a linker 41. As described above, the photosensitive drum 23 and the transferring roller 26 are arranged to extend in the front-and-rear direction (rotation axis direction) so as to be parallel with each other. The rotation driver 40 rotates the photosensitive drum 23. The linker 41 changes the nipping pressure of the transferring nip N in accordance with change of the peripheral speed ratio.

The photosensitive drum 23 includes a photosensitive layer 23b which is laminated on an outer circumferential face of a drum element tube 23a (rotation axis). The drum element tube 23a is cylindrically formed by a conductive material such as aluminum, for example. Longitudinal both ends of the drum element tube 23a are supported to be rotatable via a pair of front and rear drum bearings (not shown). Each drum bearing is fixed to a frame (not shown) of the apparatus main body 2. The photosensitive layer 23b is formed of an amorphous silicon photosensitive body or a positively charged, single-layered organic photosensitive body.

The transferring roller 26 includes a conductive transferring rubber layer 26b which is laminated on an outer circumferential face of the rotating shaft 26a. The rotating shaft 26a is made of a conductive material such as a metal, and is formed in a cylindrical shape, for example. Both front and rear ends of the rotating shaft 26a are supported to be rotatable around a pair of front and rear transferring bearings 26c. Each transferring bearing 26c is supported to be movable in a vertical direction by the frame of the apparatus main body 2. The rotating shaft 26a is electrically connected to a transfer bias power source (not shown). The transfer bias power source applies a transfer bias, whose polarity is revered from that of a toner, to the transferring roller 26.

The rotation driver 40 includes a rotating motor 40b which is connected to the photosensitive drum 23 (drum element tube 23a) via a coupling 40a. The rotating motor 40b is electrically connected to the controller 14. The rotating motor 40b is controlled to be driven by the controller 14, and rotates the photosensitive drum 23 at a constant speed.

The linker 41 includes two first gears 42, two second gears 43, a pair of compressible springs 44F, 44R, a reciprocator 45, and a pressure changer 46.

The two first gears 42 are so called helical gears, and fixed to be arranged at a rear side of the photosensitive drum 23 (one side in the rotation axis direction). The two first gears 42 are fixed at both front and rear sides of a first spacer 47 so as to be spaced from each other in the front-and-rear direction. The first spacer 47 is formed to be smaller in diameter than each first gear 42. Each first gear 42 and the first spacer 47 are fixed to be engaged with a rear part of the drum element tube 23a. Each first gear 42 and the first spacer 47 rotate around the drum element tube 23a so as to be integral with the photosensitive drum 23.

The two first gears 42 have teeth whose numbers are different from each other. A plurality of teeth 42a of the two first gears 42 are respectively formed so as to be tapered (in a sharpened shape) towards the insides facing each other. In the following description, a front side first gear 42 is referred to as a first low speed gear 42L, and a rear side first gear 42 is referred to as a first high speed gear 42H. Also, in a description which is common to both of the gears 42L, 42H, these gears are referred to as first gears 42.

The two second gears 43 are respectively so called helical gears, each of which is formed to be smaller in diameter than each first gear 42. The two second gears 43 are lined at the rear side of the transferring roller 26 (one side in the rotation axis direction). The two second gears 43 are fixed at both front and rear ends of a second spacer 48 so as to be spaced from each other in the front-and-rear direction. The second spacer 48 is formed to be smaller in diameter than each second gear 43. A rear part of the rotating shaft 26a has a cross section formed in a substantial D-shape, and passes through a through hole (not shown) formed in a substantial D-shape and opened at each second gear 43 and the second spacer 48. Each second gear 43 and the second spacer 48 (hereinafter, referred to as "each second gear 43 or the like") engage with the rear part of the rotating shaft 26a so as to be slidable in the front-and-rear direction. Also, each second gear 43 or the like rotates around the rotating shaft 26a so as to be integral with the transferring roller 26.

The two second gears 43 have teeth whose numbers are different from each other. A plurality of teeth 43a of the two second gears 43 are respectively formed so as to be tapered (in a sharpened shape) towards the outsides in the front-and-rear direction. In the following description, a front side second gear 43 is referred to as a second low speed gear 43L, and a rear side second gear 43 is referred to as a second high speed gear 43H. Also, in a description which is common to both gears 43L, 43H, these gears are simply referred to as second gears 43.

When each second gear 43 or the like is shifted forward, the second low speed gear 43L meshes with the first low speed gear 42L, and constitutes a low speed gear train 50L (refer to FIG. 2). At this time, the second high speed gear 43H is positioned at a lower side of the first spacer 47. Alternatively, when each second gear 43 or the like is shifted rearward, the second high speed gear 43H meshes with the first high speed gear 42H, and constitutes a high speed gear train 50H (refer to FIG. 3). At this time, the second low speed gear 43L is positioned at the lower side of the first spacer 47. The low speed gear train 50L and the high speed gear train 50H respectively have gear ratios different from each other. The gear ratios of the plurality of gear trains 50L, 50H each are set so as to rotate the transferring roller 26 faster than the photosensitive drum 23. A front-and-rear width W1 of the first spacer 47 (gap between a pair of first gears 42) is smaller than a front-and-rear width W2 obtained by summing those of the two second gears 43 and the second spacer 48.

The pair of compressible springs 44F, 44R as biasing members are formed in a helical shape extending in the vertical direction. The pair of compressible springs 44F, 44R are provided at both sides in the front-and-rear direction, and connect upper ends (first ends) to the transferring roller 26 side. In more detail, the upper ends of the pair of compressible springs 44F, 44R each are fixed to a lower end face of each transferring bearing 26c. A lower end of the front side compressible spring 44F is fixed to a pedestal 2a of the apparatus main body 2. The rear side compressible spring 44R is provided so as to be wound around a pillar member 44a extending downward from the transferring bearing 26c. A lower end (second end) of the rear side compressible spring 44R comes into contact with the pressure changer 46 which will be described later. The pair of compressible springs 44F, 44R bias the transferring roller 26 towards the photosensitive drum 23.

The reciprocator 45 includes an engagement slider 51 and a change driver 52.

The engagement slider 51 includes an engagement base 51a, an engagement supporting part 51b, and a pair of engagement protrusions 51c. The engagement base 51a, the engagement supporting part 51b, and each engagement protrusion 51c are integrally formed.

The engagement base 51a is formed in a substantially platy shape. The engagement base 51a slidably engages on a rail 45a which is provided in the frame of the apparatus main body 2. The rail 45a is arranged to extend in the front-and-rear direction in the frame of the apparatus main body 2. Namely, the engagement slider 51 is capable of reciprocating in the front-and-rear direction.

The engagement supporting part 51b is formed in a substantially parallelepiped shape. The engagement supporting part 51b is fixed to a rear side of a top face of the engagement base 51a. The pair of engagement protrusions 51c are arranged to extend upward from both front and rear sides of the top face of the engagement supporting part 51b. Between the pair of engagement protrusions 51c, the two second gears 43 fit at an interval. Namely, the engagement slider 51 is formed so as to sandwich the two second gears 43 from both sides in the front-and-rear direction. The two second gears 43 are disposed in a rotatable state in a range surrounded by the engagement supporting part 51b and the pair of engagement protrusions 51c.

The change driver 52 is a push-pull type solenoid actuator connected to the engagement slider 51. The change driver 52 is electrically connected to the controller 14. The change driver 52 is controlled to be driven by the controller 14, and reciprocates the engagement slider 51 in the front-and-rear direction.

The pressure changer 46 includes a cam face 53. The cam face 53 is capable of reciprocating integrally with the engagement slider 51 in the front-and-rear direction in a state where the cam face 53 comes into slide contact with the lower end (second end) of the rear side compressible spring 44R. The cam face 53 is formed at a front side of a top face of the engagement base 51a. The cam face 53 is formed so as to compress or release compression of the compressible spring 44R.

In more detail, the cam face 53 includes a releasing face 53a, a compressing face 53b, and an inclined face 53c. The releasing face 53a is formed on the top face of the engagement base 51a in front of the engagement supporting part 51b. The releasing face 53a is formed on a same plane as a joining face between the engagement base 51a and the engagement supporting part 51b. The compressing face 53b is formed more forward and upward than the releasing face 53a. The compressing face 53b forms a plane which is parallel to the releasing face 53a. The inclined face 53c is formed to couple the releasing face 53a and the compressing face 53b. The inclined face 53c is formed to have an upward slope towards a front side. A lower end of the pillar member 44a described above is formed at a length which does not come into contact with the compressing face 53b.

Next, with reference to FIG. 2 and FIG. 3, functions of the drive transmitting device 30 will be described. The linker 41 of the drive transmitting device 30 links pressure change operation to change the pressure force of the transferring roller 26 to the photosensitive drum 23 with speed change operation to change the speed ratio (peripheral speed ratio) of a surface of the photosensitive drum 23 and a surface of the transferring roller 26. The rotation driver 40 (rotating motor 40b) rotates the photosensitive drum 23 at a constant speed.

First, as shown in FIG. 2, in a case where a toner image is transferred to standard paper as a sheet S, the low speed gear train 50L is configured. At this time, a lower end face of the rear side compressible spring 44R comes into contact with the releasing face 53a of the pressure changer 46. A rotation speed (peripheral speed) of the transferring roller 26 in this state is defined as a standard speed, and a nipping pressure of the transferring nip N in this state is defined as a standard pressure.

Next, a case of transferring a toner image to a cardboard as a sheet S will be described. A user operates an operating panel (not shown) of the printer 1 or an external device (not shown) which is connected to the printer 1, and inputs a type of the sheet S.

The controller 14, when receiving input information indicative of the cardboard, controls driving of the change driver 52 (starts the speed change operation). The change driver 52 shifts the engagement slider 51 rearward along the rail 45a. The front side engagement protrusion 51c then comes into contact with a front side face of the second low speed gear 43L, and pushes each second gear 43 or the like rearward. Namely, each second gear 43 or the like shifts rearward integrally with the engagement slider 51.

When shifting of the engagement slider 51 advances, the second high speed gear 43H starts to mesh with the first high speed gear 42H. As described above, the teeth 42a, 43a of both gears 42H, 43H each are formed in a sharpened shape, thus enabling both gears 42H, 43H to smoothly mesh with each other. The front-and-rear width W1 of the first spacer 47 is smaller than the front-and-rear width W2 of each second gear 43 or the like and thus the two first gears 42 and the two second gears 43 temporarily mesh with each other in the process of the speed change operation.

As shown in FIG. 3, when the shifting of the engagement slider 51 further advances, the meshing of the first low speed gear 42L and the second low speed gear 43L is released, and the second high speed gear 43H meshes with the first high speed gear 42H. Namely, the low speed gear train 50L is released, and the high speed gear train 50H is configured. In this manner, the rotation speed (peripheral speed) of the transferring roller 26 can be made faster than the standard speed.

Here, a driving force of rotating the photosensitive drum 23 is transmitted to the transferring roller 26 via the second gear 43 which meshes with the first gear 42. At this time, at a meshing portion between the first gear 42 and the second gear 43, a counterforce acts on a direction in which these gears are spaced from each other. This counterforce increases, as the rotation speed of the transferring roller 26 increases. Thus, there is a fear that, if a linear speed ratio between the photosensitive drum 23 and the transferring roller 26 changes, a pressure force to bring the transferring roller 26 into pressure contact with the photosensitive drum 23 lowers at a rear side (driving force transmission side). Therefore, the linker 41 is configured to synchronize the pressure change operation with the speed change operation.

The pressure changer 46 (cam face 53) increases or decreases biasing force of the compressible spring 44R that is provided at a rear side (one side in the rotation axis direction) so as to be directly proportional to the rotation speed of the transferring roller 26. That is, according to shifting of the engagement slider 51, a lower end face of the compressible spring 44R passes through the inclined face 53c from the releasing face 53a, and relatively slides towards the compressing face 53b. As shown in FIG. 3, when the second high speed gear 43H shifts to a position which meshes with the first high speed gear 42H, the lower end face of the compressible spring 44R relatively shifts to the compressing face 53b. The compressible spring 44R is then compressed, and the biasing force of the compressible spring 44R increases. In this manner, the nipping pressure of the transferring nip N can be made greater than the standard pressure.

Although a detailed description is omitted, the change driver 52 shifts the engagement slider 51 forward, whereby the high speed gear train 50H is released, and the low speed gear train 50L is configured (refer to FIG. 2). Also, the lower end face of the compressible spring 44R relatively shifts from the compressing face 53b to the releasing face 53a (refer to FIG. 2).

As described above, the reciprocator 45 reciprocates the two second gears 43 in the front-and-rear direction, and changes one of the two second gears 43 to mesh with one of the two first gears 42, so that the speed change operation is carried out. The reciprocator 45 meshes a pair of gears which are respectively selected from the two first gears 42 and the two second gears 43. A combination of these gears is changed, and the linear speed ratio of the photosensitive drum 23 and the transferring roller 26 thereby changes.

Also, the pressure changer 46, according to the reciprocation of the two second gears 43, changes the biasing force of the compressible spring 44R that is provided at the rear side (one side in the rotation axis direction) to thereby carryout the pressure change operation. The pressure changer 46 changes the biasing force of the compressible spring 44R at the driving force transmission side, and the lowered pressure force can be returned to an appropriate value. In addition, as described above, the counterforce of the meshing portion between the gears increases or decreases so as to be directly proportional to the rotation speed of the transferring roller 26. The biasing force of the compressible spring 44R increases or decreases so as to be directly proportional to the rotation speed of the transferring roller 26 to compensate for the counterforce. In this manner, the transferring roller 26 comes into pressure contact with the photosensitive drum 23 with uniform pressure force all over the regions in the front-and-rear direction, so that an appropriate image can be formed on the sheet S. Accordingly, conveyance of the sheets S is stabilized, and a poor degree of magnification can be prevented.

With the drive transmitting device 30 according to the first embodiment that has been described above, the photosensitive drum 23 and the transferring roller 26 come into contact with each other, and therefore, if the rotation driver 40 rotates the photosensitive drum 23, the transferring roller 26 is also driven to rotate. Even in a case where the linker 41 changes the surface speed ratio (linear speed ratio) of the photosensitive drum 23 and the transferring roller 26, the photosensitive drum 23 is not affected by rotation of the transferring roller 26. In this manner, the rotation speed of the photosensitive drum 23 can be stabilized, and appropriate transfer of a toner image to the sheets S can be carried out (prevention of banding).

In addition, the linker 41, according to a change of the linear speed ratio of the photosensitive drum 23 and the transferring roller 26, changes the pressure force of the transferring roller 26 to the photosensitive drum 23. That is, the linker 41 is capable of correcting a difference in pressure force which arises between a front side and a rear side according to the change of the linear speed ratio. In this manner, appropriate conveyance of the sheets S can be carried out and then an appropriate toner image free of a magnification difference can be transferred to the sheets S (prevention of a poor degree of magnification).

Also, when the engagement slider 51 shifts in the front-and-rear direction, each second gear 43, which engages with the engagement slider 51, shifts in the front-and-rear direction. In this manner, the meshing of the first gear 42 and the second gear 43 is changed. In addition, according to the shifting of the engagement slider 51, the rear side compressible spring 44R relatively slides on the cam face 53 and expands and contracts. As described above, merely by reciprocating the engagement slider 51, the speed change operation (gear shifting) and the pressure change operation (expansion and contraction of the compressible spring 44R) can be appropriately linked with each other.

Figure 4:
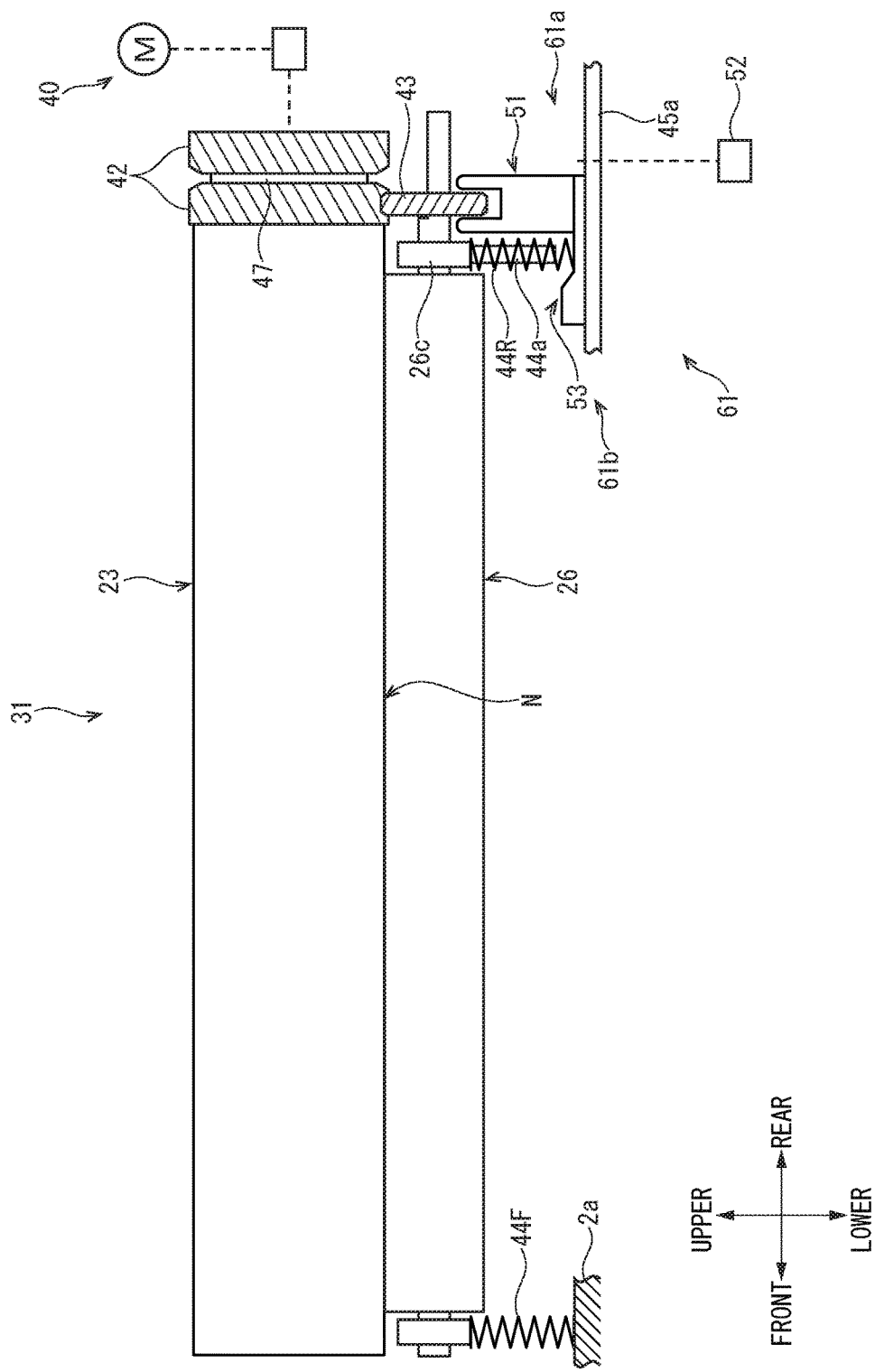
FIG. 4 is a side view showing a drive transmitting device according to a second embodiment of the present disclosure.

Further, for example, as shown in FIG. 4, as a drive transmitting device 31 according to a second embodiment, a linker 61 may include two first gears 42 and one second gear 43. In this case, a reciprocator 61a reciprocates (a single) second gear 43 in the front-and-rear direction, and changes a first gear 42 which meshes with the second gear 43 to thereby carry out speed change operation. A pressure changer 61b, according to reciprocation of the second gear 43, changes biasing force of the compressible spring 44R to thereby carry out pressure change operation. Other configurations, operations, and advantageous effects of the drive transmitting device 31 are similar to those of the drive transmitting device 30 according to the first embodiment, and therefore, a duplicate description thereof is omitted, and same reference numerals are assigned.

Figure 5:
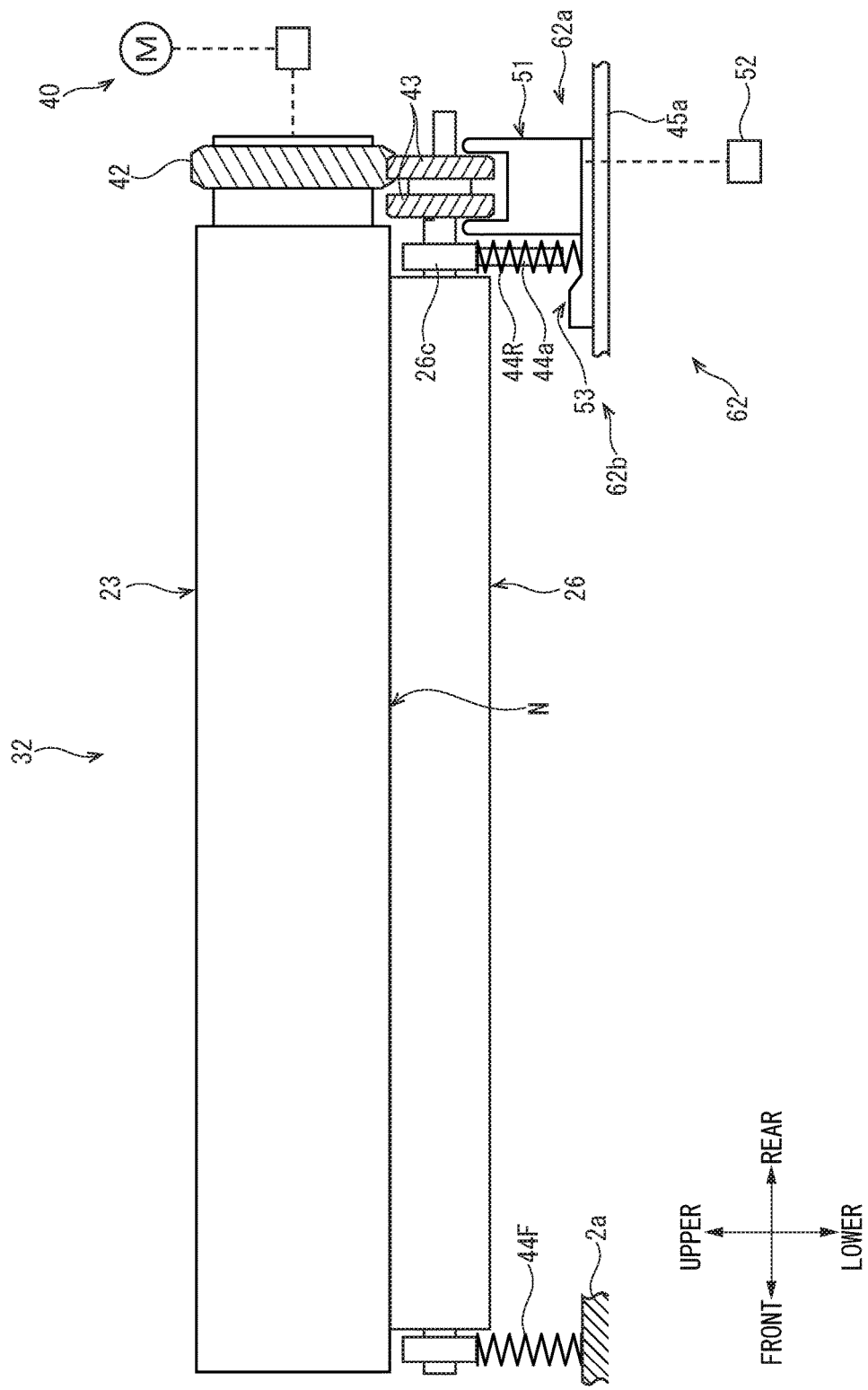
FIG. 5 is a side view showing a drive transmitting device according to a third embodiment of the present disclosure.

Furthermore, for example, as shown in FIG. 5, as a drive transmitting device 32 according to a third embodiment, a linker 62 may include a first gear 42 and two second gears 43. In this case, a reciprocator 62a reciprocates the two second gears 43 in the front-and-rear direction, and changes a second gear 43 which meshes with (a single) first gear 42 to thereby carry out speed change operation. A pressure changer 62b, according to reciprocation of the pair of second gears 43, changes biasing force of the compressible spring 44R to thereby carry out pressure change operation. Other configurations, operations, and advantageous effects of the drive transmitting device 32 are similar to those of the drive transmitting device 30 according to the first embodiment, and therefore, a duplicate description thereof is omitted, and same reference numerals are assigned.

Although the drive transmitting devices 30, 32 according to the first and third embodiments have engagement sliders 51 (a pair of engagement protrusions 51c) which sandwich two second gears 43 therebetween, the present disclosure is not limitative thereto. For example, the pair of engagement protrusions 51c may be formed so as to sandwich the second low speed gear 43L or the second high speed gear 43H therebetween.

Although the change driver 52 is composed of the solenoid actuator, the present disclosure is not limitative thereto. The change driver 52 may be a rack and pinion, a linear motor, or a piston or the like which slides in a cylinder, instead of the solenoid actuator.

Figure 6:
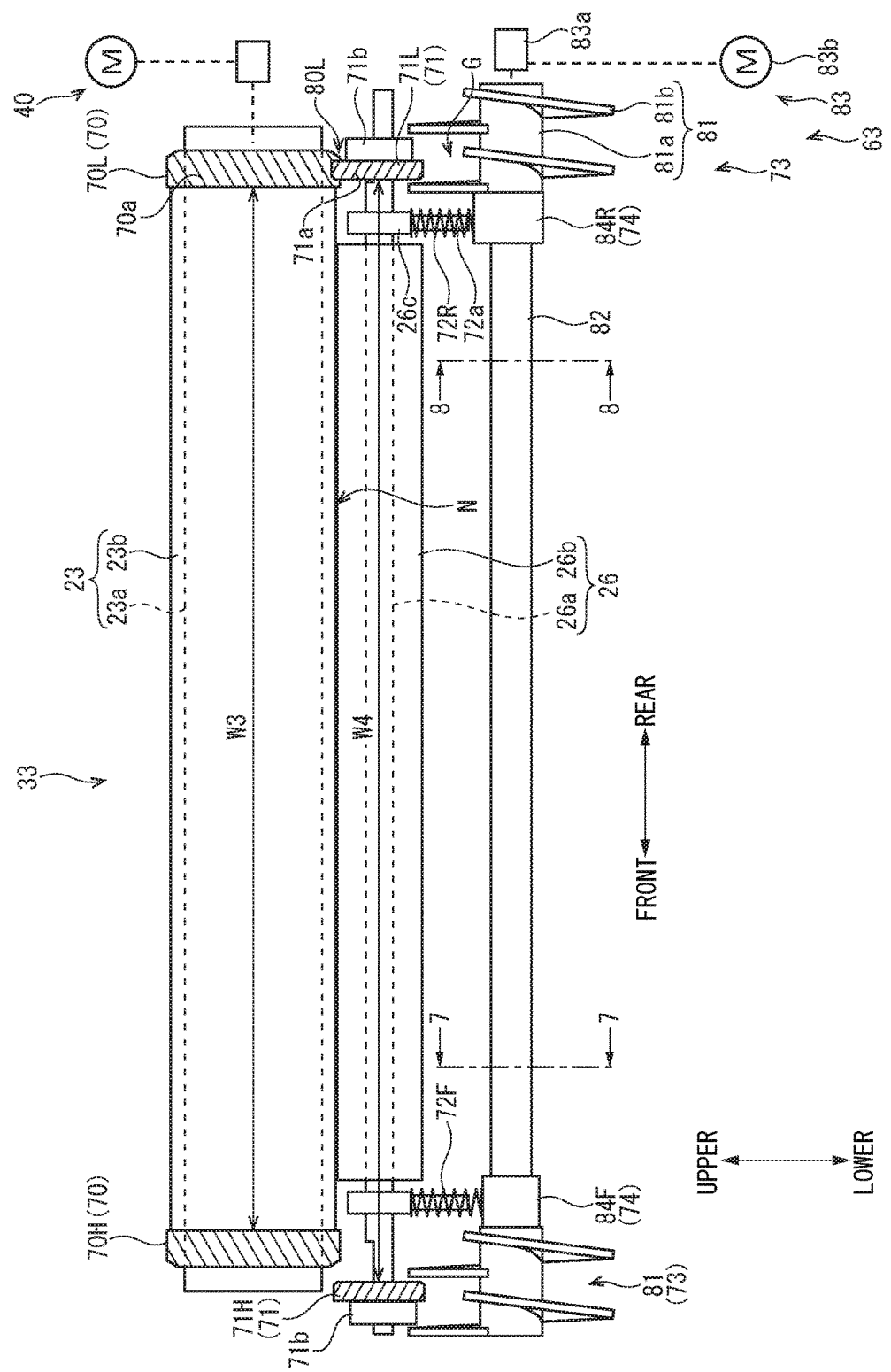
FIG. 6 is a side view showing a drive transmitting device (a low speed gear train) according to a fourth embodiment of the present disclosure.

Next, with reference to FIG. 6 to FIG. 11, a drive transmitting device 33 according to a fourth embodiment will be described. FIG. 6 is a side view showing the drive transmitting device 33 (low speed gear train 80L). FIG. 9 is a side view showing the drive transmitting device 33 (high speed gear train 80H). Hereinafter, like constituent elements of the drive transmitting device 30 according to the first embodiment are designated by like reference numerals, and a duplicate description thereof is omitted.

The drive transmitting device 33 according to the fourth embodiment includes a linker 63 which is different from that of the drive transmitting device 30 according to the first embodiment. As shown in FIG. 6, the linker 63 includes two first gears 70, two second gears 71, a pair of compressible springs 72F, 72R, a pair of reciprocators 73, and a pair of pressure changers 74.

Although each first gear 70 and each second gear 71 are the same as each first gear 42 and each second gear 43 according to the first embodiment, these gears are different from each other in layout thereof. That is, the two first gears 70 are fixed at both sides in the front-and-rear direction of the photosensitive drum 23 (drum element tube 23a), and have teeth whose numbers are different from each other. The two second gears 71 are provided at both sides in the front-and-rear direction of the transferring roller 26 (rotating shaft 26a), and have teeth whose numbers are different from each other. In the following description, a rear side first gear 70 is referred to as a first low speed gear 70L, and a front side first gear 70 is referred to as a first high speed gear 70H. Also, in a description which is common to both gears 70L, 70H, these gears are simply referred to as first gears 70. Similarly, a rear side second gear 71 is referred to as a second low speed gear 71L, and a front side second gear 71 is referred to as a second high speed gear 71H. Also, in a description which is common to both gears 71L, 71H, these gears are simply referred to as second gears 71.

Guiding members 71b are respectively fixed on a rear end face of the second low speed gear 71L and a front end face of the second high speed gear 71H. The two guiding members 71b each are formed to be smaller in diameter than the second gears 71. The two second gears 71 and the two guiding members 71b (hereinafter, referred to as "two second gears 71 or the like") slidably engage with both sides in the front-and-rear direction of the rotating shaft 26a. The two second gears 71 or the like rotate around the rotating shaft 26a so as to be integral with the transferring roller 26.

When the two second gears 71 are shifted forward, the second low speed gear 71L meshes with the first low speed gear 70L, and constitutes a low speed gear train 80L (refer to FIG. 6). At this time, the second high speed gear 71H is spaced at a front side of the first high speed gear 70H. Alternatively, when the two second gears 71 are shifted rearward, the second high speed gear 71H meshes with the first high speed gear 70H, and constitutes a high speed gear train 80H (refer to FIG. 9). At this time, the second low speed gear 71L is spaced at a rear side of the first low speed gear 70L. Gear ratios between the low speed gear train 80L and the high speed gear train 80H are different from each other, and are set so as to rotate the transferring roller 26 faster than the photosensitive drum 23. A gap W4 between the pair of front and rear second gears 71 is formed to be wider than a gap W3 between the pair of the front and rear first gears 70.

The respective compressible springs 72F, 72R as biasing members are the same as the respective compressible springs 44F, 44R according to the first embodiment. Upper ends (first ends) of the pair of compressible springs 72F, 72R each are fixed to a lower end face of the transferring bearing 26c. The pair of compressible springs 72F, 72R are provided so as to be wound around a pillar member 72a extending downward from the transferring bearing 26c. Lower ends (second ends) of the pair of compressible springs 72F, 72R each come into contact with a pressure changer 74 which will be described later.

The pair of reciprocators 73 are respectively disposed at lower sides of both front and rear ends of the transferring roller 26. The pair of reciprocators 73 respectively include a screw 81 having a spiral groove G with which each second gear 71 engages. A pair of screws 81 are respectively configured by fixing a spiral blade 81b on an outer circumferential face of a cylinder 81a. The pair of screws 81 are fixed at both front and rear ends of a change rotating shaft 82 which is disposed to be parallel to the transferring roller 26. The blade 81b of the plurality of screws 81 is formed to be phased along the change rotating shaft 82. The spiral groove G is formed between the blade 81b and the blade 81b. In the groove G of each screw 81, the second gear 71 and the guiding member 71b fit at an interval.

A change driver 83 is coupled to the change rotating shaft 82. The change driver 83 includes a change motor 83b connected to the change rotating shaft 82 via a coupling 83a. The change motor 83b is electrically connected to the controller 14. The change motor 83b is controlled to be driven by the controller 14, and normally or reversely rotates the change rotating shaft 82 (each screw 81).

The pair of pressure changers 74 include a pair of eccentric cams 84F, 84R. The pair of eccentric cams 84F, 84R are fixed at both front and rear sides of the change rotating shaft 82. The pair of eccentric cams 84F, 84R are disposed inside of the pair of screws 81 in the front-and-rear direction. The pair of eccentric cams 84F, 84R are integrally rotatable with the screw 81 in a state where the pair of eccentric cams 84F, 84R come into slide contact with lower ends (second ends) of the compressible springs 72F, 72R. The pair of eccentric cams 84F, 84R are formed to compress or release compression of the compressible springs 72F, 72R.

In more detail, on outer circumferential faces of the respective eccentric cams 84F, 84R, cam faces 85F, 85R are formed. The respective cam faces 85F, 85R include releasing faces 851F, 851R, compressing faces 852F, 852R, interconnecting faces 853F, 853R, and steps 854F, 854R. The pair of eccentric cams 84F, 84R each are formed in a substantially similar shape, and hereinafter, a cam face 85R of a rear side eccentric cam 84R will be mainly described.

The compressing face 852R is protruded outside in a radial direction more significantly than the releasing face 851R. The compressing face 852R is formed so that a distance from an axial center (change rotating shaft 82) becomes maximal in the cam face 85R. The interconnecting face 853R is formed between the releasing face 851R and the compressing face 852R. The releasing face 851R and the interconnecting face 853R are formed so that a distance from the axial center becomes the same. The step 854R is formed between the releasing face 851R and the compressing face 852R. The compressing face 852F of the front side eccentric cam 84F is formed so as to be slightly larger (longer in distance from the axial center) in protrusion quantity than the compressing face 852R of the rear side eccentric cam 84R.

Next, functions of the drive transmitting device 33 will be described. The rotation driver 40 rotates the photosensitive drum 23 at a constant speed.

Figure 7:
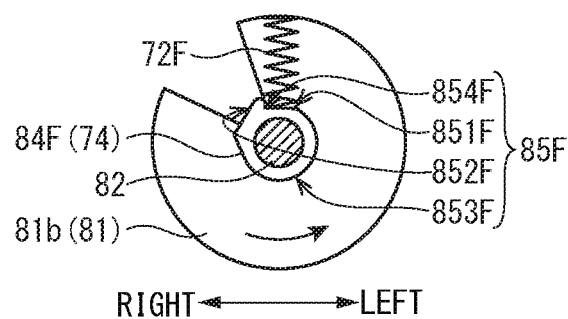
FIG. 7 is a sectional view taken along a line 7-7 of FIG. 6.
Figure 8:
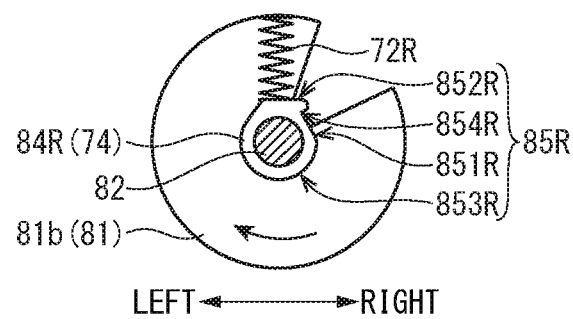
FIG. 8 is a sectional view taken along a line 8-8 of FIG. 6.
Figure 9:
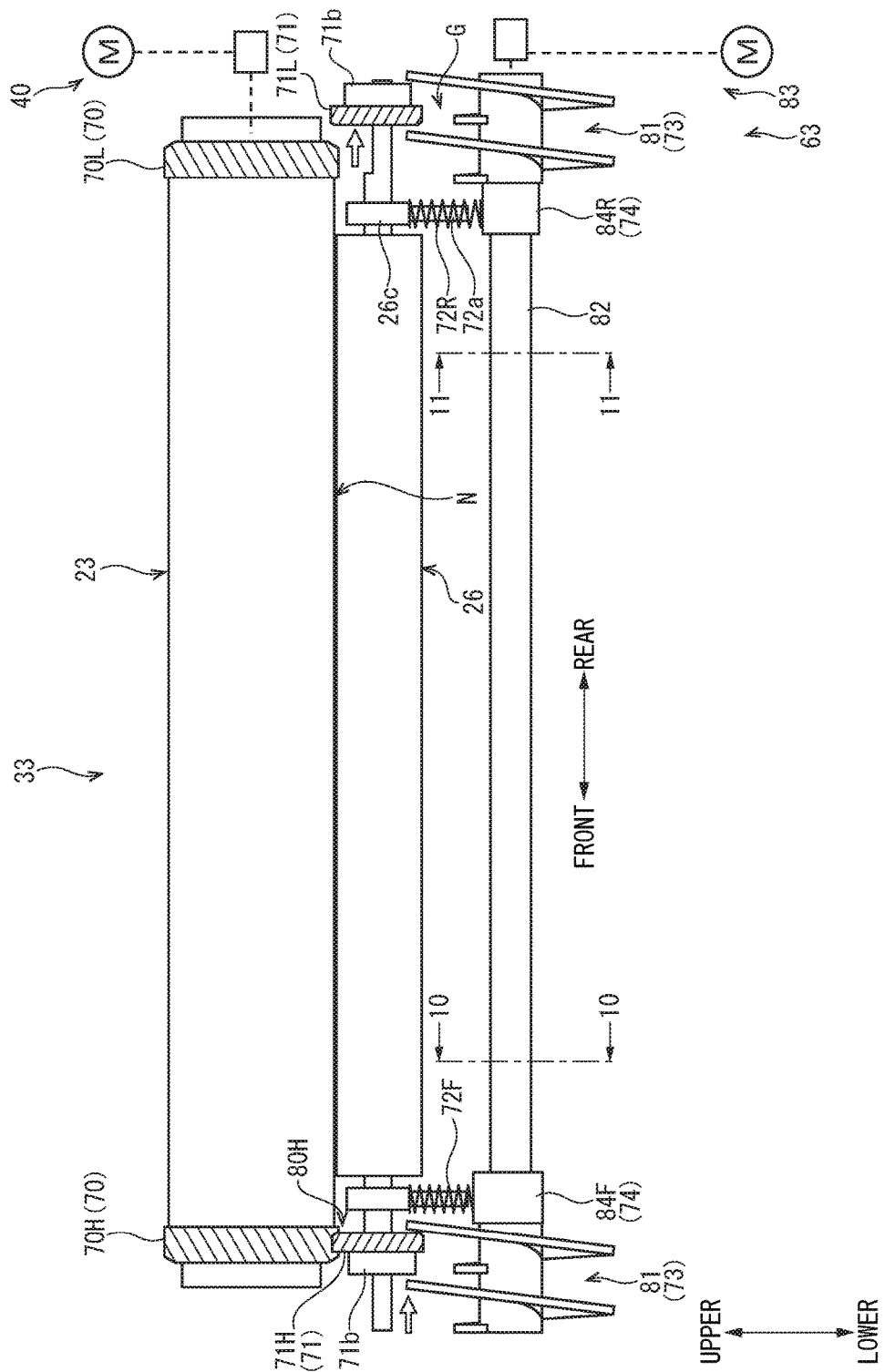
FIG. 9 is a side view showing the drive transmitting device (a high speed gear train) according to the fourth embodiment of the present disclosure.

First, as shown in FIG. 6 to FIG. 8, in a case where a toner image is transferred to standard paper as a sheet S, the low speed gear train 80L is configured. At this time, the two second gears 71 or the like fit into a front side of the groove G of the screw 81. Also, at this time, a lower end face of the rear side compressible spring 72R comes into contact with the compressing face 852R of the rear side eccentric cam 84R. A lower end face of the front side compressible spring 72F comes into contact with the releasing face 851F of the front side eccentric cam 84F. A lower end (second end) of the front side compressible spring 72F comes into contact with the step 854F. The rotation speed (peripheral speed) of the transferring roller 26 in this state is defined as a standard speed, and the nipping pressure of the transferring nip N in this state is defined as a standard pressure.

Next, a case of transferring a toner image to a cardboard as a sheet S will be described. The controller 14, when receiving input information indicative of a cardboard, controls driving of the change driver 83 (change motor 83b) (speed change operation is started). The change motor 83b rotates the change rotating shaft 82 clockwise as seen from a front side, for example. Then, the pair of front and rear screws 81 also rotate and thus the two second gears 71 or the like are guided by the spiral groove G, and shifts rearward.

As shown in FIG. 9, when rotation of each screw 81 advances, the meshing of the second low speed gear 71L and the first low speed gear 70L is released, and the second high speed gear 71H meshes with the first high speed gear 70H. Namely, the low speed gear train 80L is released, and the high speed gear train 80H is configured. In this manner, the rotation speed (peripheral speed) of the transferring roller 26 can be made faster than the standard speed. At this time, the two second gears 71 or the like each fit in the rear side of the groove G of the screw 81. Like the respective gears 42, 43 of the first embodiment, teeth 70a of the first gear 70 and teeth 71a of the second gear 71 are formed in a sharpened shape in order to ensure smooth meshing.

Also, the linker 63 executes pressure change operation linked with the speed change operation. The pressure changer 74 (eccentric cam 84F) as a first pressure changer which is provided at a meshing side (front side) of the first high speed gear 70H and the second high speed gear 71H increases or decreases the biasing force of the front side compressible spring 72F as a first biasing member so as to be directly proportional to the rotation speed of the transferring roller 26. Alternatively, a pressure changer 74 (eccentric cam 84R) as a second pressure changer which is provided at a meshing release side (rear side) of the first low speed gear 70L and the second low speed gear 71L increases or decreases the biasing force of the rear side compressible spring 72R as a second biasing member so as to be inversely proportional to the rotation speed of the transferring roller 26.

Figure 10:
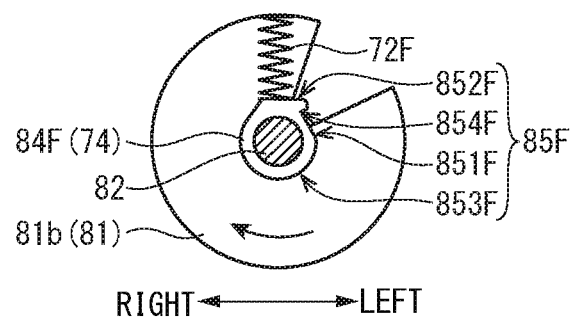
FIG. 10 is a sectional view taken along a line 10-10 of FIG. 9.
Figure 11:
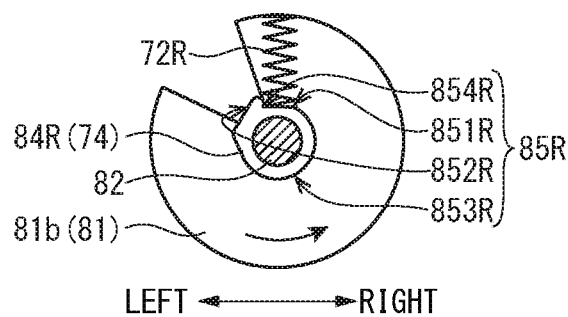
FIG. 11 is a sectional view taken along a line 11-11 of FIG. 9.

That is, according to rotation of the change rotating shaft 82 (eccentric cams 84F, 84R), a lower end face of the front side compressible spring 72F passes through the interconnecting face 853F from the releasing face 851F, and relatively slides towards the compressing face 852F. At the same time, a lower end face of the rear side compressible spring 72R passes through the interconnecting face 853R from the compressing face 852R, and relatively slides towards the releasing face 851R. As shown in FIG. 9 to FIG. 11, when the second high speed gear 71H shifts to a position meshing with the first high speed gear 70H, a lower end face of the compressible spring 72F relatively shifts to the compressing face 852F, and a lower end face of the compressible spring 72R relatively shifts to the releasing face 851R. Then, the compressible spring 72F is compressed, and the biasing force of the compressible spring 72F increases. On the other hand, compression of the compressible spring 72R is released, and the biasing force of the compressible spring 72R decreases. As described above, the front side compressing face 852F protrudes more significantly than the rear side compressing face 852R and thus the nipping pressure of the transferring nip N becomes greater than the standard pressure.

Although a detailed description is omitted, the change motor 83b rotates the change rotating shaft 82 counterclockwise as seen from a front side, whereby the high speed gear train 80H is released, and the low speed gear train 80L is configured. Also, a lower end face of the compressible spring 72F relatively slides from the compressing face 852F to the releasing face 851F, and a lower end face of the compressible spring 72R relatively slides from the releasing face 851R to the compressing face 852R.

With the drive transmitting device 33 according to the fourth embodiment described above, the pair of reciprocators 73 reciprocate the two second gears 71 in the front-and-rear direction, and changes any one of the plurality of second gears 71 which meshes with any one of the plurality of first gears 70 (changes meshing of the first gear 70 and the second gear 71 forward or rearward) to thereby carry out the speed change operation. Namely, a transmission part of the driving force is changed between one and the other in the rotation axis direction.

The pair of pressure changers 74, according to reciprocation of the two second gears 71, executes the pressure change operation to change the biasing force of the pair of compressible springs 72F, 72R. Specifically, the biasing force of the compressible spring 72F (R) at the meshing side of the respective gears 70, 71 is increased or decreased so as to be directly proportional to the rotation speed of the transferring roller 26. On the other hand, the biasing force of the compressible spring 72F (R) at the meshing release side of the respective gears 70, 71 is increased or decreased so as to be inversely proportional to the rotation speed of the transferring roller 26. Namely, the biasing force of the pair of compressible springs 72F, 72R is changed so as to compensate for the counterforce of the meshing part. Afterwards, the transferring roller 26 comes into pressure contact with the photosensitive drum 23 with a uniform pressure force all over the region in the front-and-rear direction. In this manner, conveyance of the sheets S is stabilized, and a poor degree of magnification can be prevented.

Also, according to rotation of the change rotating shaft 82, the respective compressible springs 72F, 72R relatively slide on the eccentric cams 84F, 84R, and expand and contract. As described above, merely by rotating the change rotating shaft 82, speed change operation (gear changing) and pressure change operation (expansion and contraction of compressible spring) can be appropriately linked with each other.

The drive transmitting device 33 according to the fourth embodiment may employ a reciprocator 45 and a pressure changer 46 of the drive transmitting devices 30 to 32 according to the first to third embodiments instead of each reciprocator 73 and each pressure changer 74. Conversely, the drive transmitting devices 30 to 32 according to the first to third embodiments may employ the reciprocator 73 and the pressure changer 74 according to the fourth embodiment instead of the reciprocator 45 and the pressure changer 46.

Although, in the drive transmitting device 33 according to the fourth embodiment, the two first gears 70 have teeth whose numbers are different from each other, and the two second gears 71 also have teeth whose numbers are different from each other, the present disclosure is not limitative thereto. Either the two first gears 70 or the two second gears 71 may have teeth whose numbers are different from each other. For example, the two first gears may have teeth with the same number, and the two second gears may have teeth whose numbers are different from each other.

Figure 12:
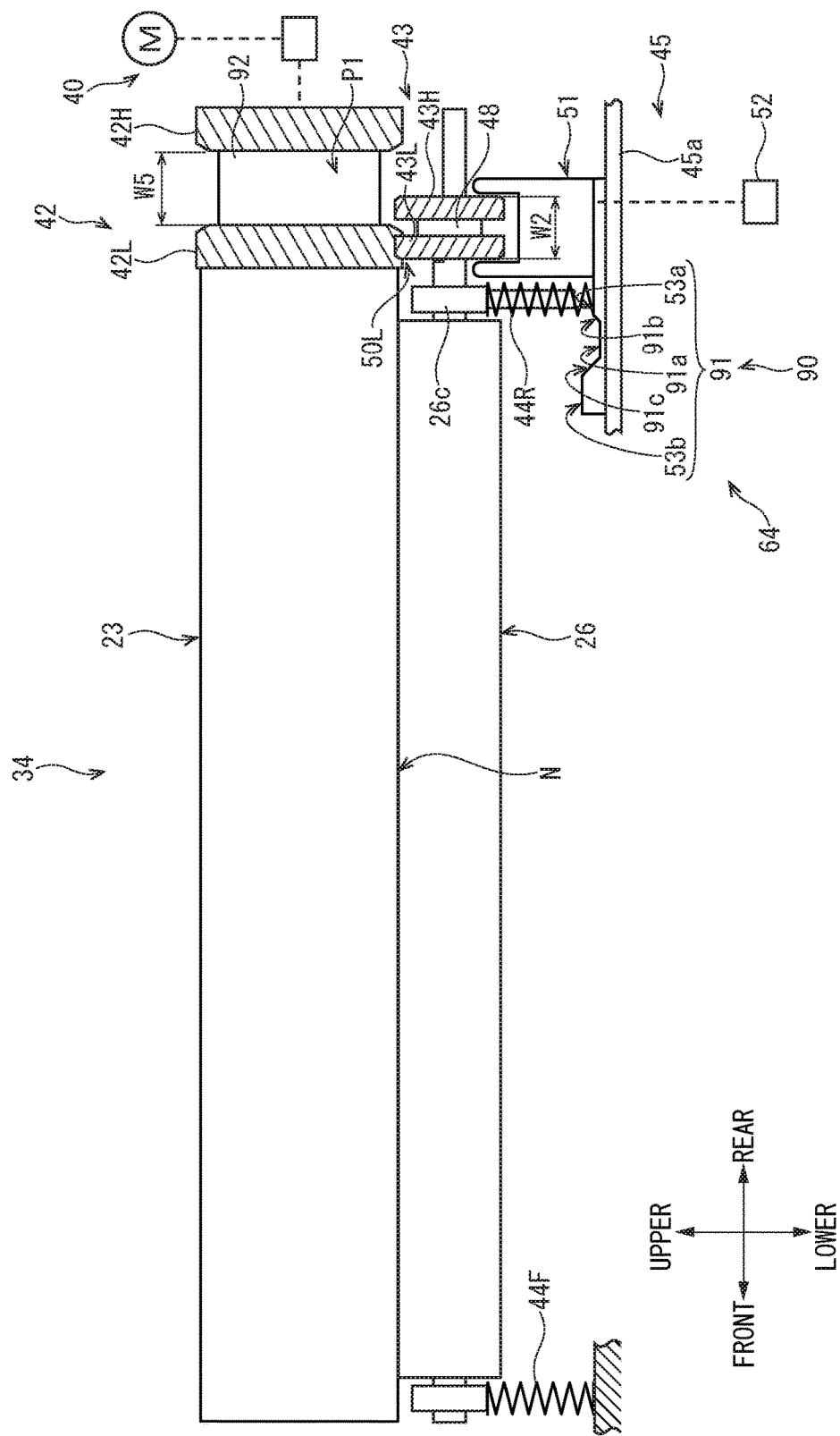
FIG. 12 is a side view showing a drive transmitting device (a low speed gear train) according to a fifth embodiment of the present disclosure.
Figure 13:
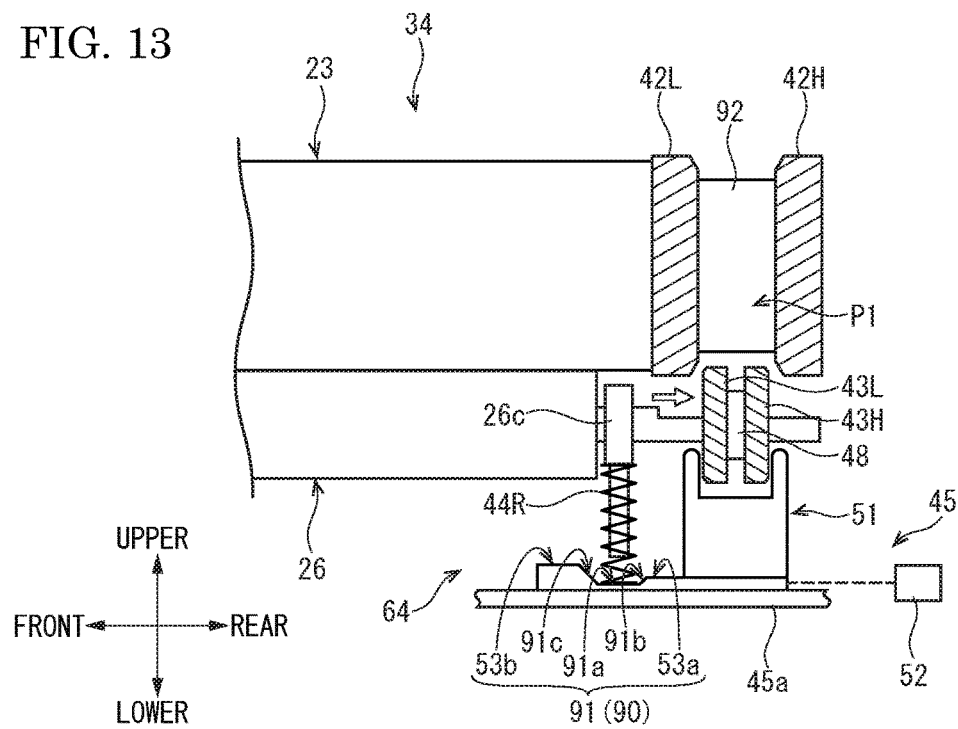
FIGS. 13 and 14 are side views for explaining action of the drive transmitting device according to the fifth embodiment of the present disclosure.
Figure 14:
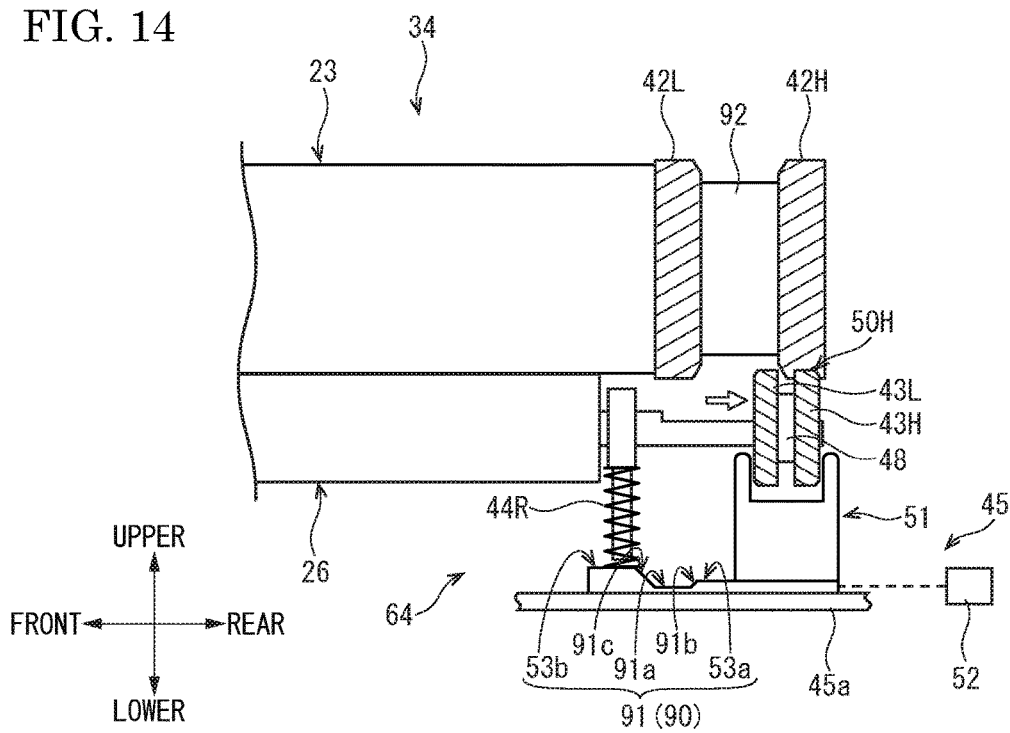

Next, with reference to FIG. 12 to FIG. 14, a drive transmitting device 34 according to a fifth embodiment will be described. FIG. 12 is a side view showing the drive transmitting device 34 (low speed gear train). FIG. 13 and FIG. 14 are side views for explaining action of the drive transmitting device 34. Hereinafter, like constituent elements of the drive transmitting device 30 according to the first embodiment are designated by like reference numerals, and a duplicate description thereof is omitted.

The drive transmitting device 34 according to the fifth embodiment includes a pressure changer 90 which is different from that of the drive transmitting device 30 according to the first embodiment. The pressure changer 90 (cam face 91) of a linker 64 makes first biasing force smaller than second biasing force. The first biasing force is biasing force of the compressible spring 44R in a process of changing the meshing of a first gear 42 and a second gear 43. The second biasing force is biasing force of the compressible spring 44R in a state where the first gear 42 and the second gear 43 mesh with each other.

As shown in FIG. 12, the cam face 91 of the pressure changer 90 includes a releasing face 53a, a compressing face 53b, a change releasing face 91a, a first inclined face 91b, and a second inclined face 91c. The change releasing face 91a is formed between the releasing face 53a and the compressing face 53b. The change releasing face 91a is formed at a lower side of the releasing face 53a. The first inclined face 91b is formed so as to couple the releasing face 53a and the change releasing face 91a. The first inclined face 91b is formed to have a downward slope towards a front side. The second inclined face 91c is formed so as to couple the change releasing face 91a and the compressing face 53b. The second inclined face 91c is formed to have an upward slope towards a front side.

Also, the drive transmitting device 34 according to the fifth embodiment includes a first spacer 92 which is different from that of the drive transmitting device 30 according to the first embodiment. A front-and-rear width W5 of the first spacer 92 (gap between a pair of first gears 42) is formed to be larger than a front-and-rear width W2 of each second gear 43 or the like.

Next, action of the drive transmitting device 34 will be described. Specifically, the course of releasing a low speed gear train 50L and configuring a highspeed gear train 50H will be described. A state in which a second low speed gear 43L meshes with a first low speed gear 42L, and a lower end face of a rear side compressible spring 44R comes into contact with the releasing face 53a of the cam face 91 is defined as an initial state (standard speed and standard pressure).

A change driver 52 is controlled to be driven by a controller 14, and shifts an engagement slider 51 rearward along a rail 45a (speed change operation is started). Then, each second gear 43 or the like shifts rearward integrally with the engagement slider 51.

As shown in FIG. 13, when shifting of the engagement slider 51 advances, the meshing of the first low speed gear 42L and the second low speed gear 43L is released, and each second gear 43 or the like shifts to a lower side of the first spacer 92 (a space between a pair of first gears 42). At this time, a pair of second gears 43 do not mesh with any member. Thus, between the pair of first gears 42 as a shifting path of each second gear 43 or the like, a releasing position P1 is set to temporarily release the meshing of the respective gears 42, 43 in the process of changing the meshing of the first gear 42 and the second gear 43. As shown in FIG. 14, when shifting of the engagement slider 51 further advances, a second high speed gear 43H meshes with a first high speed gear 42H. Namely, the low speed gear train 50L is released, and the high speed gear train 50H is configured.

Also, pressure change operation is executed synchronously with speed change operation. When shifting of the engagement slider 51 advances, a lower end face of the compressible spring 44R passes through the first inclined face 91b from the releasing face 53a, and relatively slides towards the change releasing face 91a. As shown in FIG. 13, when each second gear 43 or the like shifts to the releasing position P1, the lower end face of the compressible spring 44R relatively moves to the change releasing face 91a. At this time, the compressible spring 44R expands and thus biasing force of the compressible spring 44R gets smaller than the initial state. Namely, a nipping pressure of a transferring nip N becomes smaller than the standard pressure.

When shifting of the engagement slider 51 further advances, the lower end face of the compressible spring 44R passes through the second inclined face 91c from the change releasing face 91a, and relatively slides towards the compressing face 53b. As shown in FIG. 14, when the second high speed gear 43H shifts to a position which meshes with the first high speed gear 42H, the lower end face of the compressible spring 44R relatively shifts to the compressing face 53b. At this time, the compressible spring 44R is compressed and thus the biasing force of the compressible spring 44R gets larger than the initial state. In this manner, the nipping pressure of the transferring nip N can be made greater than the standard pressure.

Although a detailed description is omitted, the change driver 52 shifts the engagement slider 51 forward, whereby the high speed gear train 50H is released, and the low speed gear train 50L is configured. Also, the lower end face of the compressible spring 44R relatively slides from the compressing face 53b to the releasing face 53a.

With the drive transmitting device 34 according to the fifth embodiment described above, in the process of changing the meshing of the first gear 42 and the second gear 43, the meshing of the respective gears 42, 43 is temporarily released and the biasing force of the compressible spring 44R gets small, so that changing operation can be smoothly carried out.

Figure 15:
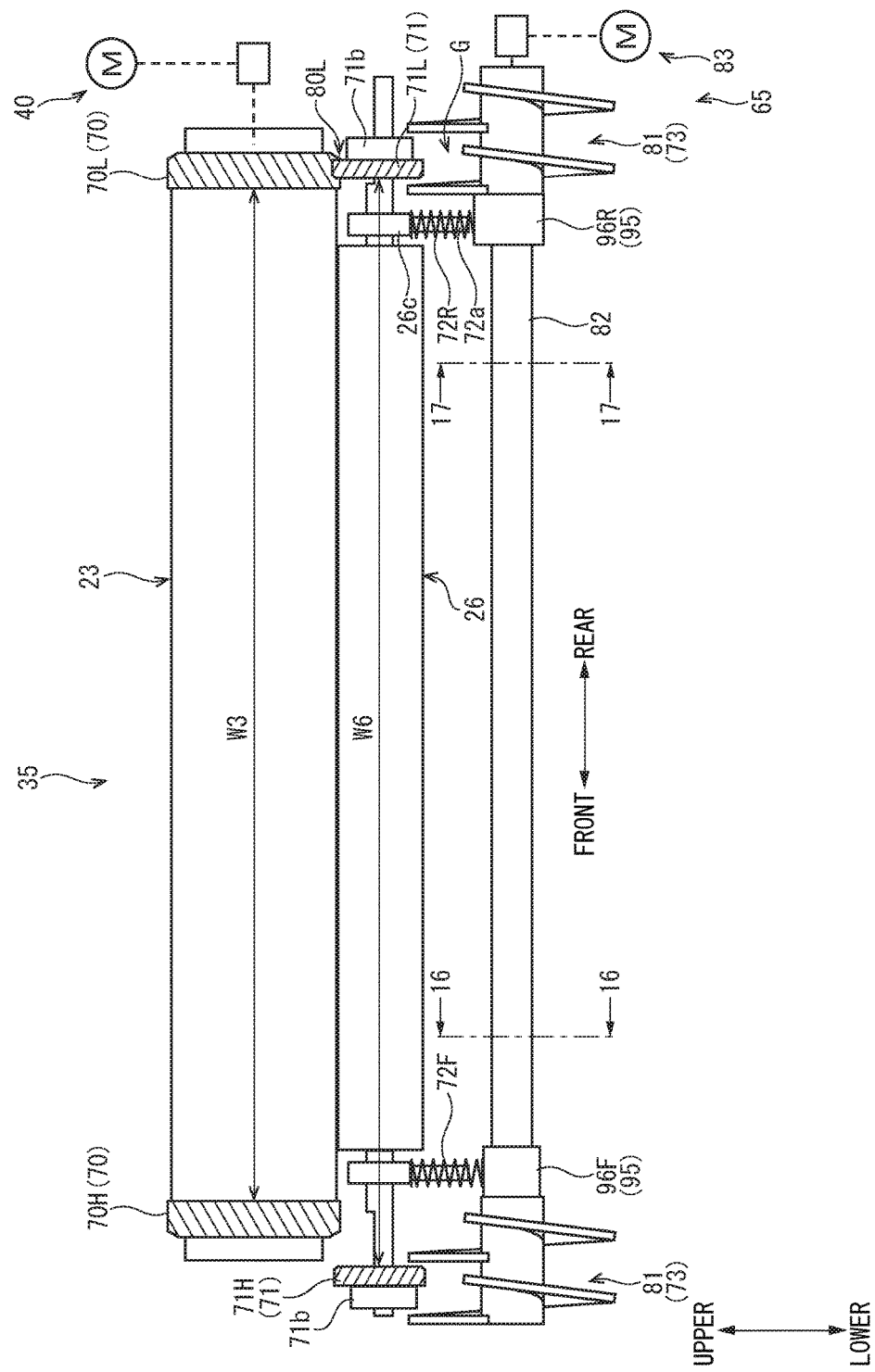
FIG. 15 is a side view showing a drive transmitting device (a low speed gear train) according to a sixth embodiment of the present disclosure.
Figure 16:
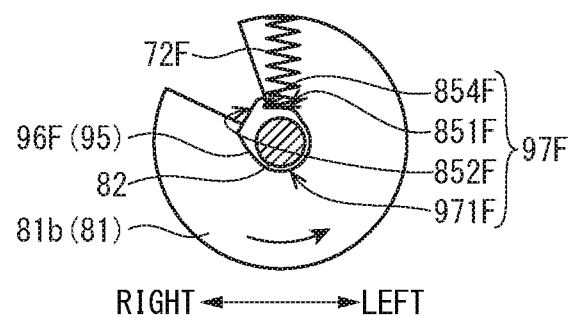
FIG. 16 is a sectional view taken along a line 16-16 of FIG. 15.
Figure 17:
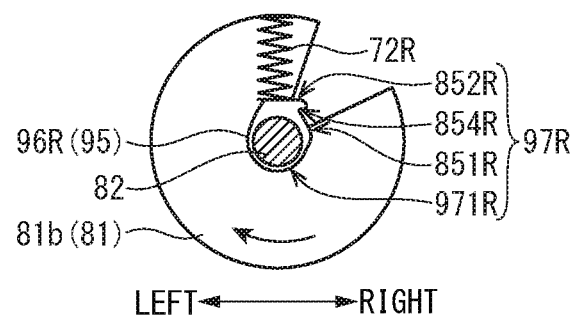
FIG. 17 is a sectional view taken along a line 17-17 of FIG. 15.
Figure 18:
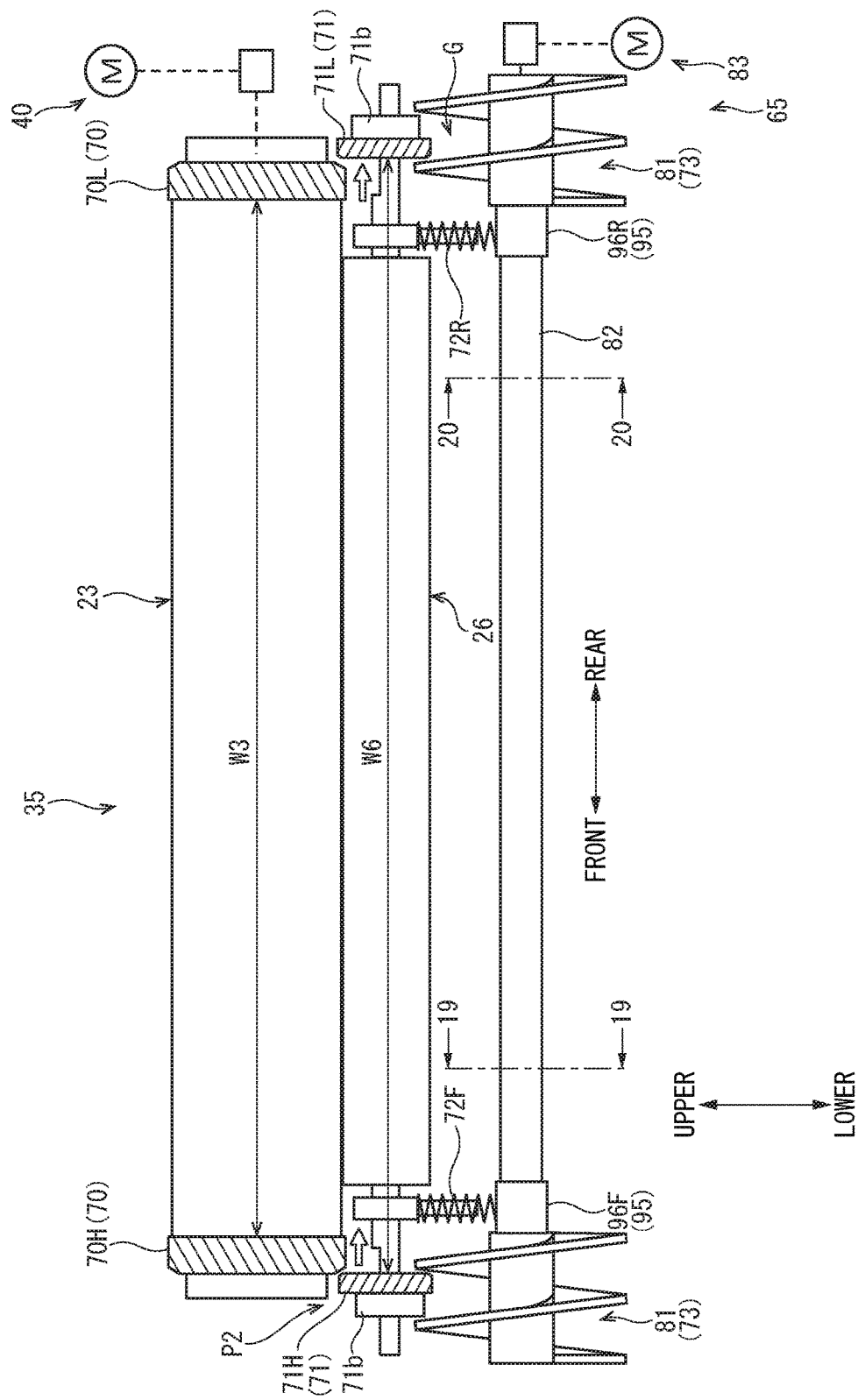
FIG. 18 is a side view showing the drive transmitting device (in a process of changing) according to the sixth embodiment of the present disclosure.

Next, with reference to FIG. 15 to FIG. 23, a drive transmitting device 35 according to a sixth embodiment will be described. FIG. 15 is a side view showing the drive transmitting device 35 (low speed gear train 80L). FIG. 18 is a side view showing the drive transmitting device 35 (in a process of changing). FIG. 21 is a side view showing the drive transmitting device 35 (high speed gear train 80H). Hereinafter, like constituent elements of the drive transmitting device 33 according to the fourth embodiment are designated by like reference numerals, and a duplicate description thereof is omitted.

A technical idea of the drive transmitting device 34 according to the fifth embodiment is applied to the drive transmitting device 35 according to the sixth embodiment. As shown in FIG. 15 to FIG. 17, a pair of pressure changers 95 of a linker 65 (a pair of eccentric cams 96F, 96R) include interconnecting faces 971F, 971R on which a distance from an axial center becomes minimal in the cam faces 97F, 97R.

Also, a gap W6 between a pair of front and rear second gears 71 is formed to be wider than the gap W4 according to the fourth embodiment.

Action of the drive transmitting device 35 according to the sixth embodiment will be briefly described. A state in which a second low speed gear 71L meshes with a first low speed gear 70L, a lower end face of a front side compressible spring 72F comes into contact with a releasing face 851F, and a lower end face of a rear side compressible spring 72R comes into contact with a compressing face 852R is defined as an initial state (standard speed and standard pressure) (refer to FIG. 15 to FIG. 17).

As shown in FIG. 18, when rotation (speed change operation) of each screw 81 (change rotating shaft 82) advances, the meshing of the first low speed gear 70L and the second low speed gear 71L is released. At this time, the meshing of the first high speed gear 70H and the second high speed gear 71H is also in a released state. Namely, a pair of front and rear second gears 71 are located at a releasing position P2 at which the meshing of the respective first gears 70 is temporally released. As shown in FIG. 21, rotation of each screw 81 further advances, the second high speed gear 71H meshes with the first high speed gear 70H, and the high speed gear train 80H is configured.

Figure 19:
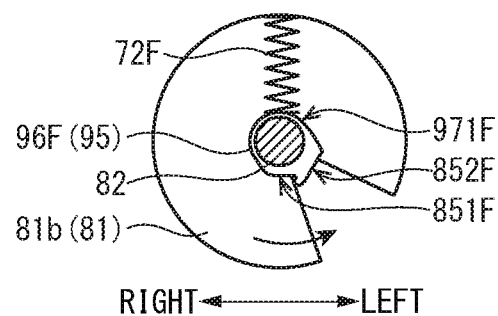
FIG. 19 is a sectional view taken along a line 19-19 of FIG. 18.
Figure 20:
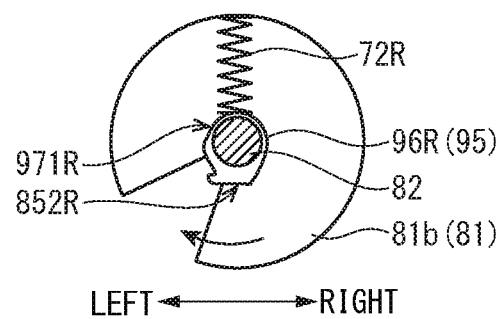
FIG. 20 is a sectional view taken along a line 20-20 of FIG. 18.
Figure 21:
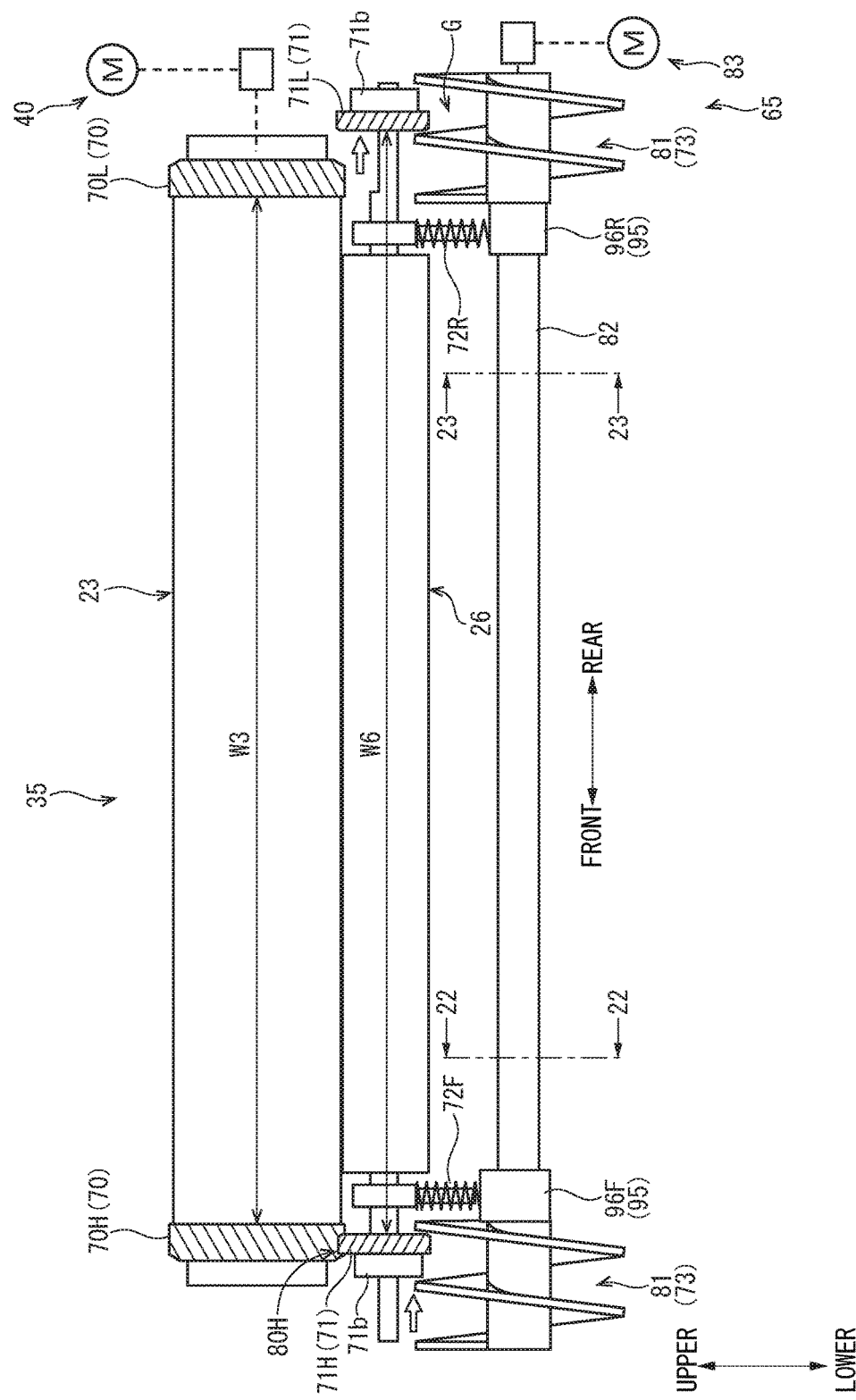
FIG. 21 is a side view showing the drive transmitting device (a high speed gear train) according to the sixth embodiment of the present disclosure.

Also, as shown in FIG. 19 and FIG. 20, rotation (pressure change operation) of eccentric cams 96F, 96R (change rotating shaft 82) advances, a lower end face of the front side compressible spring 72F relatively slides from the releasing face 851F towards an interconnecting face 971F. At the same time, a lower end face of a rear side compressible spring 72R relatively slides from the compressing face 852R towards an interconnecting face 971R. When a pair of front and rear second gears 71 shift to the releasing position P2, the lower end faces of the respective compressible springs 72F, 72R relatively shift to the interconnecting faces 971F, 971R. At this time, the respective compressible springs 72F, 72R expand and thus the biasing force of the respective compressible springs 72F, 72R each gets smaller than the initial state. Namely, a nipping pressure of a transferring nip N becomes smaller than the standard pressure.

Figure 22:
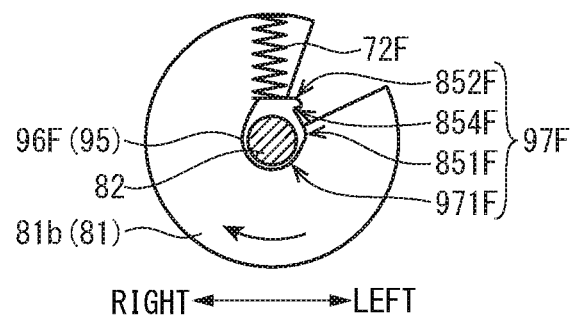
FIG. 22 is a sectional view taken along a line 22-22 of FIG. 21.
Figure 23:
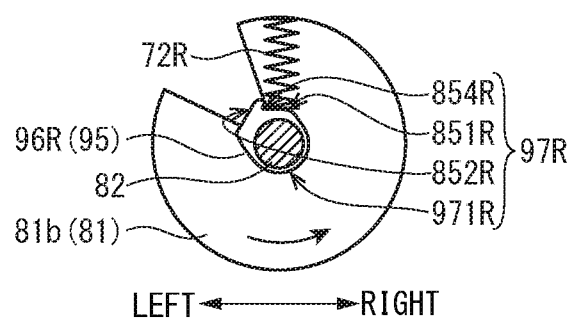
FIG. 23 is a sectional view taken along a line 23-23 of FIG. 21.

Rotation of the eccentric cams 96F, 96R further advances, the lower end face of the front side compressible spring 72F relatively slides from the interconnecting face 971F towards a compressing face 852F. At the same time, the lower end face of the rear side compressible spring 72R relatively slides from the interconnecting face 971R towards a releasing face 851R. As shown in FIG. 22 and FIG. 23, when the second high speed gear 71H moves to a position which meshes with the first high speed gear 70H, the lower end face of the front side compressible spring 72F relatively shifts to the compressing face 852F. At the same time, the lower end face of the rear side compressible spring 72R relatively shifts to the releasing face 851R. In this manner, biasing force of the compressible spring 72F increases, and biasing force of the compressible spring 72R decreases. Afterwards, the nipping pressure of the transferring nip N becomes greater than the standard pressure.

With the drive transmitting device 35 according to the sixth embodiment described above, advantageous effects similar to those of the drive transmitting device 34 according to the fifth embodiment can be attained.

Although, in the drive transmitting devices 30 to 35 according to the first to sixth embodiments, two first gears 42 (excluding the drive transmitting device 32) and two second gears 43 (excluding the drive transmitting device 31) are provided, the present disclosure is not limitative thereto. Although not shown, for example, three or more first gears 42 and three or more second gears 43 may be provided, and three or more gear trains may be configured.

Although the embodiments are described as to the drive transmitting devices 30 to 35 which rotate the photosensitive drum 23 and the transferring roller 26 as an example, the present disclosure may be applied to a fixing device or a conveying roller pair for conveyance of a sheet S, for example, without being limitative thereto.

Although the embodiments are described by showing a case in which the present disclosure is applied to a monochrome printer 1 as an example, the present disclosure may be applied to a color printer, a copying machine, a facsimile machine, or a multifunction peripheral or the like, for example, without being limitative thereto.

While the present disclosure has been described with reference to the particular illustrative embodiments, it is not to be restricted by the embodiments. It is to be appreciated that those skilled in the art can change or modify the embodiments without departing from the scope and spirit of the present disclosure.

The invention claimed is:

1. A drive transmitting device comprising:
   a first rotator being rotatable;
   a second rotator being rotatable in a state where the second rotator comes into pressure contact with the first rotator;
   a rotation driver rotating the first rotator; and
   a linker linking speed change operation with pressure change operation, the speed change operation being operation to change a speed ratio of a surface of the first rotator and a surface of the second rotator, the pressure change operation being operation to change pressure force of the second rotator to the first rotator,
   wherein the first rotator and the second rotator extend in a rotation axis direction so as to be parallel with each other, and
   the linker includes:
   a plurality of first gears lined at and fixed to the first rotator at one side in the rotation axis direction, the plurality of first gears having teeth whose numbers are different from each other;
   a second gear arranged at the second rotator at the one side in the rotation axis direction;
   a pair of biasing members arranged at both sides in the rotation axis direction and biasing the second rotator to the first rotator;
   a reciprocator reciprocating the second gear in the rotation axis direction so as to carry out the speed change operation by changing one of the plurality of first gears to mesh with the second gear; and
   a pressure changer carrying out the pressure change operation by changing biasing force of one of the pair of biasing members arranged at the one side in the rotation axis direction, as the second gear reciprocates.

2. The drive transmitting device according to claim 1,
   wherein the rotation driver rotates the first rotator at a fixed speed, and
   the second rotator rotates according to rotation of the first rotator, and
   a gear ratio of a gear train composed of the one of the plurality of first gears and the second gear is set so that the second rotator rotates faster than the first rotator, and
   the pressure changer increases or decreases the biasing force of the one of the pair of biasing members arranged at the one side in the rotation axis direction so that the biasing force is directly proportional to a rotation speed of the second rotator.

3. A drive transmitting device comprising:
   a first rotator being rotatable;
   a second rotator being rotatable in a state where the second rotator comes into pressure contact with the first rotator;
   a rotation driver rotating the first rotator; and
   a linker linking speed change operation with pressure change operation, the speed change operation being operation to change a speed ratio of a surface of the first rotator and a surface of the second rotator, the pressure change operation being operation to change pressure force of the second rotator to the first rotator,
   wherein the first rotator and the second rotator extend in a rotation axis direction so as to be parallel with each other, and
   the linker includes:
   a first gear fixed to the first rotator at one side in the rotation axis direction;
   a plurality of second gears lined at the second rotator at the one side in the rotation axis direction, the plurality of second gears having teeth whose numbers are different from each other;
   a pair of biasing members arranged at both sides in the rotation axis direction and biasing the second rotator to the first rotator;
   a reciprocator reciprocating the plurality of second gears in the rotation axis direction so as to carry out the speed change operation by changing one of the plurality of second gears to mesh with the first gear; and
   a pressure changer carrying out the pressure change operation by changing biasing force of one of the pair of biasing members arranged at the one side in the rotation axis direction, as the plurality of second gears reciprocate.

4. The drive transmitting device according to claim 3,
   wherein the rotation driver rotates the first rotator at a fixed speed, and
   the second rotator rotates according to rotation of the first rotator, and
   a gear ratio of a gear train composed of the first gear and the one of the plurality of second gears is set so that the second rotator rotates faster than the first rotator, and
   the pressure changer increases or decreases the biasing force of the one of the pair of biasing members arranged at the one side in the rotation axis direction so that the biasing force is directly proportional to a rotation speed of the second rotator.

5. A drive transmitting device comprising:
   a first rotator being rotatable;
   a second rotator being rotatable in a state where the second rotator comes into pressure contact with the first rotator;
   a rotation driver rotating the first rotator; and
   a linker linking speed change operation with pressure change operation, the speed change operation being operation to change a speed ratio of a surface of the first rotator and a surface of the second rotator, the pressure change operation being operation to change pressure force of the second rotator to the first rotator,
   wherein the first rotator and the second rotator extend in a rotation axis direction so as to be parallel with each other, and
   the linker includes:

a plurality of first gears lined at and fixed to the first rotator at one side in the rotation axis direction, the plurality of first gears having teeth whose numbers are different from each other;

a plurality of second gears lined at the second rotator at the one side in the rotation axis direction, the plurality of second gears having teeth whose numbers are different from each other;

a pair of biasing members arranged at both sides in the rotation axis direction and biasing the second rotator to the first rotator;

a reciprocator reciprocating the plurality of second gears in the rotation axis direction so as to carry out the speed change operation by changing one of the plurality of second gears to mesh with one of the plurality of first gears; and a pressure changer carrying out the pressure change operation by changing biasing force of one of the pair of biasing members arranged at the one side in the rotation axis direction, as the plurality of second gears reciprocate.

6. The drive transmitting device according to claim 5, wherein the rotation driver rotates the first rotator at a fixed speed, and the second rotator rotates according to rotation of the first rotator, and a gear ratio of a gear train composed of the one of the plurality of first gears and the one of the plurality of second gears is set so that the second rotator rotates faster than the first rotator, and the pressure changer increases or decreases the biasing force of the one of the pair of biasing members arranged at the one side in the rotation axis direction so that the biasing force is directly proportional to a rotation speed of the second rotator.

7. The drive transmitting device according to claim 5, wherein the pressure changer makes first biasing force smaller than second biasing force, the first biasing force being the biasing force of the one of the pair of biasing members in a process of changing the one of the plurality of second gears to mesh with the one of the plurality of first gears, the second biasing force being the biasing force of the one of the pair of biasing members in a state where the one of the plurality of second gears meshes with the one of the plurality of first gears.

8. The drive transmitting device according to claim 7, wherein a mesh of the plurality of second gears with the plurality of first gears is temporally released in the process of changing the one of the plurality of second gears to mesh with the one of the plurality of first gears.

9. The drive transmitting device according to claim 5, wherein each of the pair of biasing members is composed of a compressible spring whose first end is connected to a side of the second rotator, and the reciprocator includes:

an engagement slider being movable along the rotation axis direction and nipping at least one of the plurality of second gears from both sides in the rotation axis direction; and a change driver reciprocating the engagement slider, and the pressure changer includes a cam face which moves integrally with the engagement slider in the rotation axis direction in a state where the cam face comes into slide contact with a second end of the compressible spring so that the cam face compresses the compressible spring or releases compression of the compressible spring.

10. An image forming apparatus comprising the drive transmitting device according to claim 5, wherein the first rotator is a photosensitive drum carrying a toner image, and the second rotator is a transferring roller coming into pressure contact with the photosensitive drum and forming a transferring nip so as to transfer the toner image, which is carried by the photosensitive drum, on a sheet passing the transferring nip.

11. An image forming apparatus comprising the drive transmitting device according to claim 5.

12. A drive transmitting device comprising:

a first rotator being rotatable;

a second rotator being rotatable in a state where the second rotator comes into pressure contact with the first rotator;

a rotation driver rotating the first rotator; and a linker linking speed change operation with pressure change operation, the speed change operation being operation to change a speed ratio of a surface of the first rotator and a surface of the second rotator, the pressure change operation being operation to change pressure force of the second rotator to the first rotator, wherein the first rotator and the second rotator extend in a rotation axis direction so as to be parallel with each other, and the linker includes:

a plurality of first gears fixed to the first rotator at both sides in the rotation axis direction;

a plurality of second gears arranged at the second rotator at the both sides in the rotation axis direction;

a pair of biasing members arranged at the both sides in the rotation axis direction and biasing the second rotator to the first rotator;

a pair of reciprocators reciprocating the plurality of second gears in the rotation axis direction so as to carry out the speed change operation by changing one of the plurality of second gears to mesh with one of the plurality of first gears; and a pair of pressure changers carrying out the pressure change operation by changing biasing force of the pair of biasing members, as the plurality of second gears reciprocate, and at least one of the plurality of first gears and the plurality of second gears have teeth whose numbers are different from each other.

13. The drive transmitting device according to claim 12, wherein the pair of pressure changers include a first pressure changer and a second pressure changer, the pair of biasing members include a first biasing member and a second biasing member, the rotation driver rotates the first rotator at a fixed speed, the second rotator rotates according to rotation of the first rotator, a gear ratio of a gear train composed of the one of the plurality of first gears and the one of the plurality of second gears is set so that the second rotator rotates faster than the first rotator, the first pressure changer increases or decreases biasing force of the first biasing member so that the biasing force of the first biasing member is directly proportional to a rotation speed of the second rotator, and the second pressure changer increases or decreases biasing force of the second biasing member so that the biasing force of the second biasing member is inversely proportional to the rotation speed of the second rotator.

14. The drive transmitting device according to claim 12, wherein each of the pair of biasing members is composed of a compressible spring whose first end is connected to a side of the second rotator, each of the pair of reciprocators includes a screw having a spiral groove into which at least one of the plurality of second gears is fitted, the screw being rotated normally or reversely by a change driver, and each of the pair of the pressure changers includes an eccentric cam which rotates integrally with the screw in a state where the eccentric cam comes into slide contact with a second end of the compressible spring so that the eccentric cam compresses the compressible spring or releases compression of the compressible spring.

\* \* \* \* \*